(12) United States Patent
Kim

(10) Patent No.: US 11,642,931 B2
(45) Date of Patent: May 9, 2023

(54) CONTINUOUS DAMPING CONTROL SHOCK ABSORBER

(71) Applicant: HL MANDO CORPORATION, Pyeongtaek (KR)

(72) Inventor: Youngjae Kim, Daejeon (KR)

(73) Assignee: HL MANDO CORPORATION, Pyeongtaek (KR)

( * ) Notice: Subject to any disclaimer, the term of this patent is extended or adjusted under 35 U.S.C. 154(b) by 228 days.

(21) Appl. No.: 17/151,668

(22) Filed: Jan. 19, 2021

(65) Prior Publication Data

US 2021/0283974 A1 Sep. 16, 2021

(30) Foreign Application Priority Data

Mar. 11, 2020 (KR) .................. 10-2020-0030077

(51) Int. Cl.
*F16F 9/46* (2006.01)
*B60G 17/08* (2006.01)
*F16F 9/34* (2006.01)
*F16F 9/512* (2006.01)

(52) U.S. Cl.
CPC .............. *B60G 17/08* (2013.01); *F16F 9/34* (2013.01); *B60G 2500/10* (2013.01); *F16F 9/46* (2013.01); *F16F 9/5126* (2013.01); *F16F 2222/06* (2013.01); *F16F 2230/36* (2013.01)

(58) Field of Classification Search
CPC ....... B60G 17/08; B60G 2500/10; F16F 9/34; F16F 9/46; F16F 9/5126; F16F 2222/06; F16F 2230/36
USPC .................................. 188/266.6, 266.8, 315
See application file for complete search history.

(56) References Cited

U.S. PATENT DOCUMENTS

| 4,650,042 A | * | 3/1987 | Knecht | F16F 9/46 |
| | | | | 188/266.8 |
| 4,802,561 A | * | 2/1989 | Knecht | F16F 9/465 |
| | | | | 188/266.6 |
| 5,735,372 A | | 4/1998 | Hamilton | |
| 11,248,677 B2 | * | 2/2022 | Deferme | F16F 9/3271 |
| 11,441,633 B2 | * | 9/2022 | Deferme | F16F 9/3271 |
| 11,454,291 B2 | * | 9/2022 | Deferme | F16F 9/185 |

(Continued)

FOREIGN PATENT DOCUMENTS

| DE | 3434877 A1 | 4/1986 |
| DE | 3609862 A1 | 10/1987 |
| DE | 4041829 A1 | 7/1992 |

(Continued)

OTHER PUBLICATIONS

DE OA dated Nov. 12, 2021.
KR OA dated Apr. 19, 2021.

*Primary Examiner* — Christopher P Schwartz
(74) *Attorney, Agent, or Firm* — Harvest IP Law LLP

(57) ABSTRACT

Disclosed is a continuous damping control shock absorber, which has a dual solenoid valve structure in which a rebound solenoid valve and a compression solenoid valve are provided, including a post port mounted on an outer side of a base shell and in which the rebound solenoid valve and the compression solenoid valve are installed to be spaced apart from each other by a predetermined distance, wherein the post port is provided with at least one communication hole to directly communicate the rebound solenoid valve and the compression solenoid valve.

19 Claims, 27 Drawing Sheets

(56) References Cited

U.S. PATENT DOCUMENTS

2015/0047937 A1* 2/2015 Kim ..................... F16F 9/185
188/322.13

FOREIGN PATENT DOCUMENTS

| DE | 4216987 A1 | 7/1993 |
| DE | 19833854 A1 | 2/1999 |
| DE | 102014009067 A1 | 2/2015 |
| JP | 2019152209 A | 9/2019 |
| KR | 20150019526 A | 2/2015 |
| KR | 1020150019526 A | 2/2015 |
| KR | 101756423 B1 | 7/2017 |

* cited by examiner

CONTINUOUS DAMPING CONTROL SHOCK ABSORBER

CROSS-REFERENCE TO RELATED APPLICATION(S)

This application is based on and claims priority under 35 U.S.C. § 119 to Korean Patent Application No. 10-2020-0030077, filed on Mar. 11, 2020, in the Korean Intellectual Property Office, the disclosure of which is incorporated by reference herein in its entirety.

BACKGROUND

1. Field

The disclosure relates to a continuous damping control shock absorber, and more particularly, to a continuous damping control shock absorber having a dual solenoid valve structure provided with a rebound solenoid valve and a compression solenoid valve.

2. Description of the Related Art

In general, a shock absorber an apparatus that is installed in a transportation means such as a vehicle to absorb and buffer vibrations or shocks transmitted from wheels in contact with a road surface during driving.

Such a shock absorber is composed of a piston rod installed inside a cylinder to perform compression and rebound strokes, a piston valve located inside the cylinder in a state of being coupled to the piston rod so as to generate a damping force, and the like.

The shock absorber has characteristics that may improve ride comfort by absorbing vibrations caused by irregularities on the road surface when a damping force is set low, and conversely, may improve steering stability by suppressing changes in the attitude of a vehicle body when a damping force is set high. Therefore, a shock absorber with different damping force characteristics set according to the purpose of use of a vehicle is applied to a conventional vehicle.

Recently, various types of continuous damping control shock absorbers capable of appropriately adjusting the damping force characteristics to improve ride comfort or steering stability depending on a road surface and driving conditions by installing a damping force variable valve capable of appropriately adjusting the damping force characteristics of a shock absorber have been developed.

For example, a continuous damping control shock absorber having a dual solenoid valve structure including a rebound solenoid valve to adjust a damping force during the rebound stroke and a compression solenoid valve to adjust a damping force during the compression stroke is disclosed in Korean Patent Application Publication No. 10-2015-0019526.

According to the disclosed literature, in the continuous damping control shock absorber, a separate separator tube is installed and used in addition to a rebound separator tube and a compression separator tube provided in a base shell in order to improve the reduction in compression damping force that occurs when two of the solenoid valves are applied. That is, a separate separator tube is installed at a location, where the rebound separator tube and the compression separator tube are connected, to surround the rebound separator tube and the compression separator tube.

However, because it is needed to install a separate separator tube as described above, an outer diameter of the base shell increases, thereby increasing a weight of the shock absorber and increasing the material cost.

In addition, because a separate separator tube need to be installed by a welding method, it is difficult to align the concentricity between a valve port of the rebound (or compression) separator tube and a valve port of the separate separator tube, thereby increasing a defect rate and lowering productivity.

SUMMARY

It is an aspect of the disclosure to provide a continuous damping control shock absorber capable of improving productivity by securing ease of mounting of a dual solenoid valve through a simple structure.

It is another aspect of the disclosure to provide a continuous damping control shock absorber capable of preventing a decrease in compression damping force by securing a mechanical flow path to improve operation independence of a rebound solenoid valve and a compression solenoid valve.

It is another aspect of the disclosure to provide a continuous damping control shock absorber capable of minimizing a defect rate as well as preventing an increase in weight and material cost compared to the prior art.

Additional aspects of the disclosure will be set forth in part in the description which follows and, in part, will be obvious from the description, or may be learned by practice of the disclosure.

In accordance with an aspect of the disclosure, a continuous damping control shock absorber, which has a dual solenoid valve structure in which a rebound solenoid valve and a compression solenoid valve are provided, includes a post port mounted on an outer side of a base shell and in which the rebound solenoid valve and the compression solenoid valve are installed to be spaced apart from each other by a predetermined distance, wherein the post port is provided with at least one communication hole to directly communicate the rebound solenoid valve and the compression solenoid valve.

The post port may include a first coupling part having a hollow portion to form a first receiving space to which the rebound solenoid valve is coupled, a second coupling part having a hollow portion forming a second receiving space to which the compression solenoid valve is coupled, and a connection part configured to connect the first coupling part and the second coupling part and having a communication hole communicating the first receiving space and the second receiving space.

The first coupling part and the second coupling part may be disposed to be spaced apart by a predetermined distance in a vertical direction to have axes parallel to each other, and the communication hole may be formed to be orthogonal to the central axes of the first and second coupling parts.

The rebound solenoid valve may include a rebound port coupled to a rebound separator tube provided inside the base shell, and a rebound valve housing forming an outer appearance of the rebound solenoid valve and coupled to the first coupling part.

The rebound port may include a first body part coupled to the rebound separator tube and having a first rebound hole formed a central hollow portion, and a first flange part extending radially from the first body part, and a second rebound hole to guide oil circulating in and being discharged from the rebound solenoid valve through the first rebound hole during a rebound stroke to the communication hole may be formed in the first flange part.

The second rebound hole may include a first rebound connection hole formed in a direction of directing to the other side of the first flange part from one side of the first flange part, and a second rebound connection hole formed on an outer circumferential surface of the first flange part to be in communication with the first rebound connection hole.

The compression solenoid valve may include a compression port coupled to a compression separator tube provided inside the base shell, and a compression valve housing forming an outer appearance of the compression solenoid valve and coupled to the second coupling part.

The compression port may include a second body part coupled to the compression separator tube and having a first compression hole formed a central hollow portion, and a second flange part extending radially from the second body part, and a second compression hole to guide oil circulating in and being discharged from the compression solenoid valve through the first compression hole during a compression stroke to a reservoir chamber may be formed in the second flange part.

A third compression hole in communication with the first compression hole to guide oil discharged through the communication hole during a rebound stroke to the first compression hole may be formed in the second flange part.

In accordance with another aspect of the disclosure, a continuous damping control shock absorber, which has a dual solenoid valve structure in which a rebound solenoid valve and a compression solenoid valve are provided, includes a bridge port mounted on an outer side of a base shell to be interposed between the rebound solenoid valve and the compression solenoid valve, wherein the bridge port is provided with a communication hole to communicate the rebound solenoid valve and the compression solenoid valve.

The rebound solenoid valve and the compression solenoid valve may be disposed to be spaced apart by a predetermined distance in a vertical direction to have axes parallel to each other, and the communication hole may be formed in the vertical direction so that oil discharged from the rebound solenoid valve directly flows toward the compression solenoid valve.

The rebound solenoid valve may include a rebound port coupled to a rebound separator tube provided inside the base shell and a rebound valve housing forming an outer appearance of the rebound solenoid valve and coupled to the outer side of the base shell, the compression solenoid valve may include a compression port coupled to a compression separator tube provided inside the base shell and a compression valve housing forming an outer appearance of the compression solenoid valve and coupled to the outer side of the base shell, the rebound valve housing may be provided with a first connection hole at a position corresponding to one side of the communication hole, and the compression valve housing may be provided with a second connection hole at a position corresponding to the other side of the communication hole.

The rebound port may include a first body part coupled to the rebound separator tube and having a rebound hole formed a central hollow portion, and a first flange part extending radially from the first body part to be coupled to the rebound valve housing.

The compression port may include a second body part coupled to the compression separator tube and having a first compression hole formed a central hollow portion, and a second flange part extending radially from the second body part to be coupled to the compression valve housing, and a second compression hole to guide oil circulating in and being discharged from the compression solenoid valve through the first compression hole during a compression stroke to a reservoir chamber may be formed in the second flange part.

The rebound solenoid valve may include a rebound port inserted into a first receiving space to be coupled to a rebound separator tube provided inside the base shell, and a rebound valve part inserted into the first receiving space to be in communication with the rebound port and to adjust a flow of oil.

The rebound port may include a first body part having a small diameter portion coupled to the rebound separator tube on one side thereof and a large diameter portion formed to expand from the other side thereof and provided with a first rebound hole formed a central hollow portion, and a first flange part extending radially from the first body part.

The compression solenoid valve may include a compression port inserted into a second receiving space to be coupled to a compression separator tube provided inside the base shell, and a compression valve part inserted into the second receiving space to be in communication with the compression port and to adjust a flow of oil.

The compression port may include a second body part coupled to the compression separator tube and provided with a first compression hole formed a central hollow portion, and a second flange part extending radially from the second body part, and a second compression hole to guide oil circulating in and being discharged from the compression valve part through the first compression hole during a compression stroke to a reservoir chamber may be formed in the second flange part.

A third compression hole in communication with the first compression hole to guide oil discharged through the communication hole during a rebound stroke to the first compression hole may be formed in the second flange part.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter embodiments of the disclosure will be described in detail with reference to the accompanying drawings. The embodiments described below are provided by way of example so that those skilled in the art will be able to fully understand the spirit of the disclosure. The disclosure is not limited to the embodiments described below, but may be embodied in other forms. In order to clearly explain the disclosure, parts not related to the description are omitted from the drawings, and the width, length, thickness, etc. of the components may be exaggerated for convenience.

Figure 1:
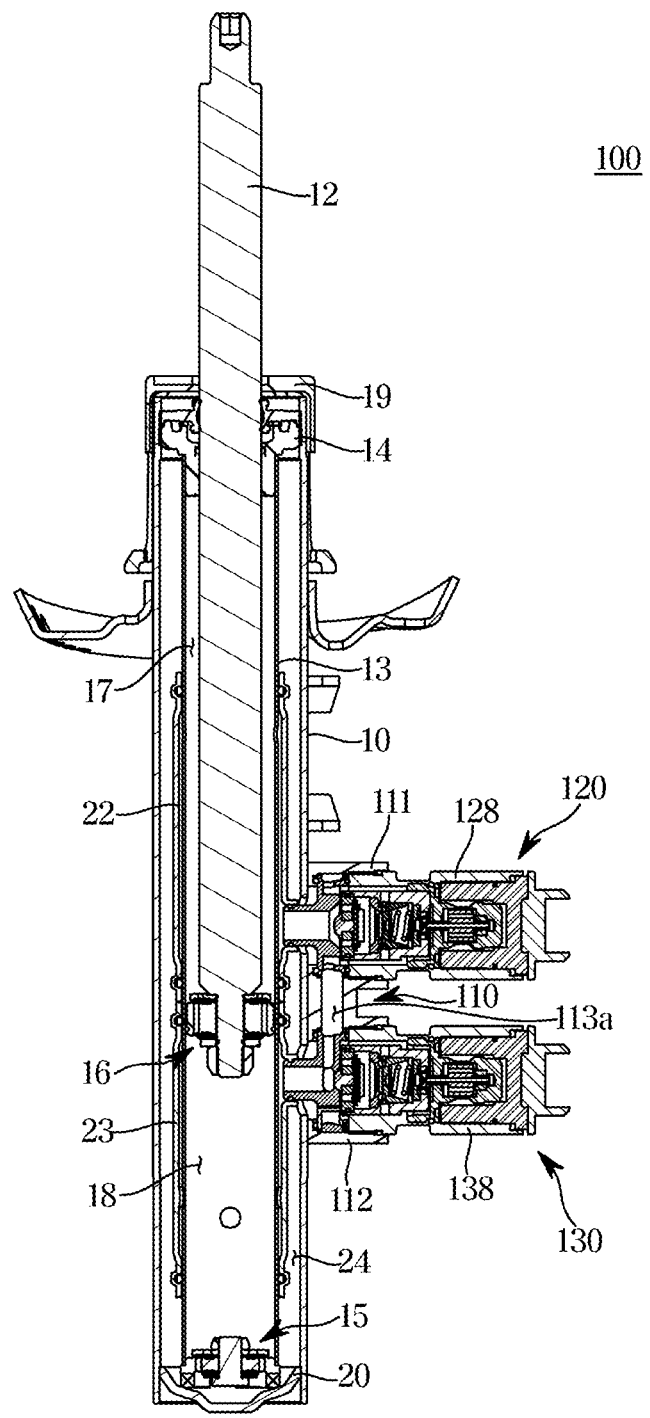
FIG. 1 is a cross-sectional view of a continuous damping control shock absorber having a structure of a dual solenoid valve according to a first embodiment of the disclosure.
Figure 2:
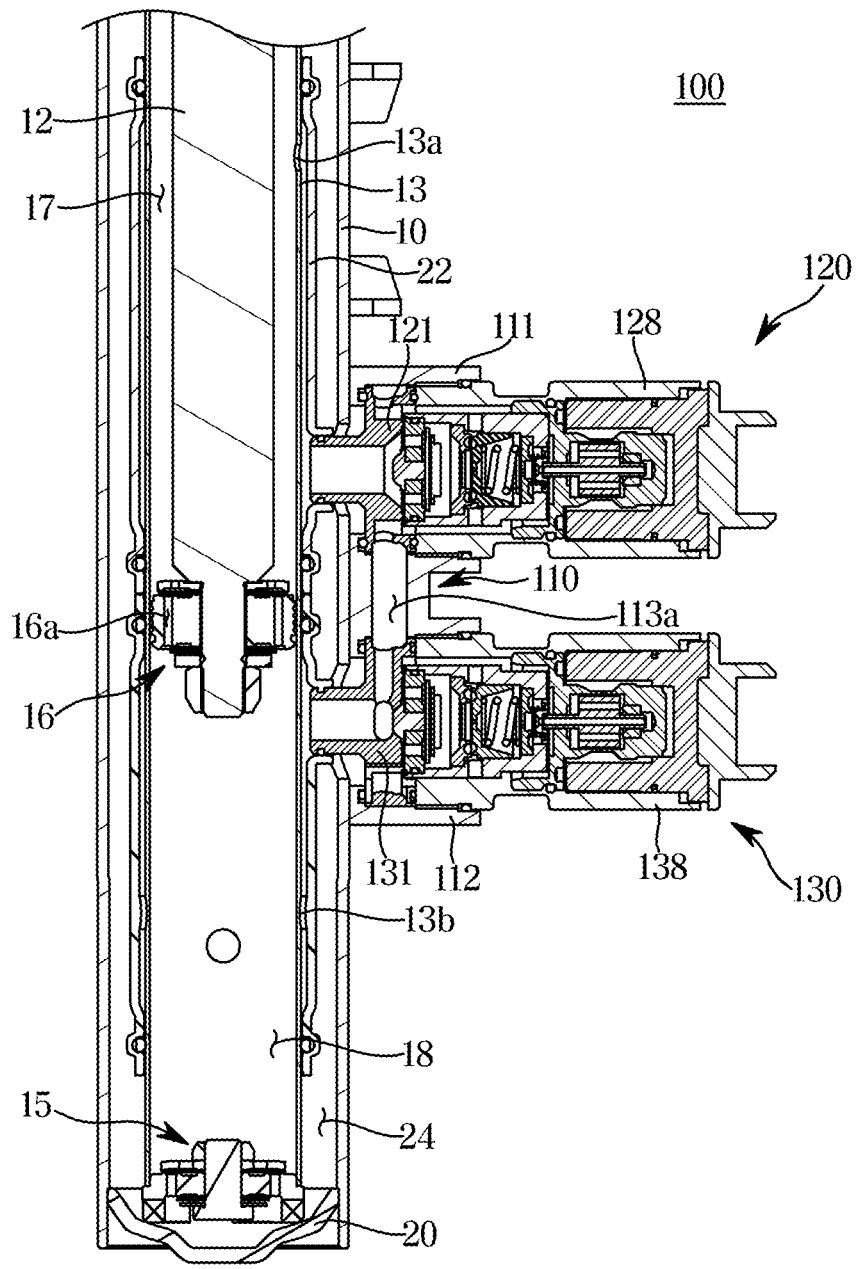
FIG. 2 is an enlarged view of a main part of FIG. 1.

FIG. 1 is a cross-sectional view of a continuous damping control shock absorber having a structure of a dual solenoid valve according to a first embodiment of the disclosure, and FIG. 2 is an enlarged view of a main part of FIG. 1.

Referring to FIGS. 1 and 2, a continuous damping control shock absorber 100 according to a first embodiment of the disclosure may include a rebound solenoid valve 120, a compression solenoid valve 130, and a post port 110 in which the rebound solenoid valve 120 and the compression solenoid valve 130 are installed.

Also, the continuous damping control shock absorber 100 includes a base shell 10, and an inner tube 13 installed inside the base shell 10 and in which a piston rod 12 is movably installed in a longitudinal direction.

A rod guide 14 and a body valve 15 are installed on upper and lower ends of the inner tube 13 and the base shell 10, respectively.

A piston valve 16 having an oil passage 16a is coupled to one end of the piston rod 12, and the piston valve 16 divides an inner space of the inner tube 13 into a rebound chamber 17 and a compression chamber 18.

An upper cap 19 and a base cap 20 are installed on upper and lower portions of the base shell 10, respectively.

Between the inner tube 13 and the base shell 10, a rebound separator tube 22 is installed on an upper side thereof, and a compression separator tube 23 is installed on a lower side thereof.

By the rebound separator tube 22 and the compression separator tube 23, a reservoir chamber 24 for compensating a volume change in the rebound chamber 17 and the compression chamber 18 according to the reciprocating motion of the piston rod 12 is formed inside the base shell 10.

In order to vary a damping force, the rebound solenoid valve 120 and the compression solenoid valve 130, which are damping force variable valves, are installed on an outer side of the base shell 10. The rebound solenoid valve 120 and the compression solenoid valve 130 may be coupled to the base shell 10 through the post port 110. A structure of being coupled through the post port 110 will be described again below.

Inner holes 13a and 13b are formed on the upper and lower sides of the inner tube 13, respectively. The inner hole 13a located on the upper side of the inner tube 13 communicates the rebound chamber 17 and a space formed between the rebound separator tube 22 and the inner tube 13. The inner hole 13b located on the lower side of the inner tube 13 communicates the compression chamber 18 and a space formed between the compression separator tube 23 and the inner tube 13. Accordingly, the rebound solenoid valve 120 coupled to the rebound separator tube 22 may be connected to the rebound chamber 17 through the upper inner hole 13a, and the compression solenoid valve 130 coupled to the compression separator tube 23 may be connected to the compression chamber 18 through the lower inner hole 13b. The inner holes 13a and 13b formed on the upper and lower sides of the inner tube 13 may be located at upper and lower sides of a movement range of the piston valve 16 moving together with the piston rod 12.

The continuous damping control shock absorber 100 described above is characterized by having a mechanical flow path that allows oil in the rebound chamber 17 to circulate through the rebound solenoid valve 120 and flow to the compression chamber 18 during a rebound stroke and allows oil in the compression chamber 18 to circulate through the compression solenoid valve 130 and flow to the reservoir chamber 24 during a compression stroke.

Figure 3:
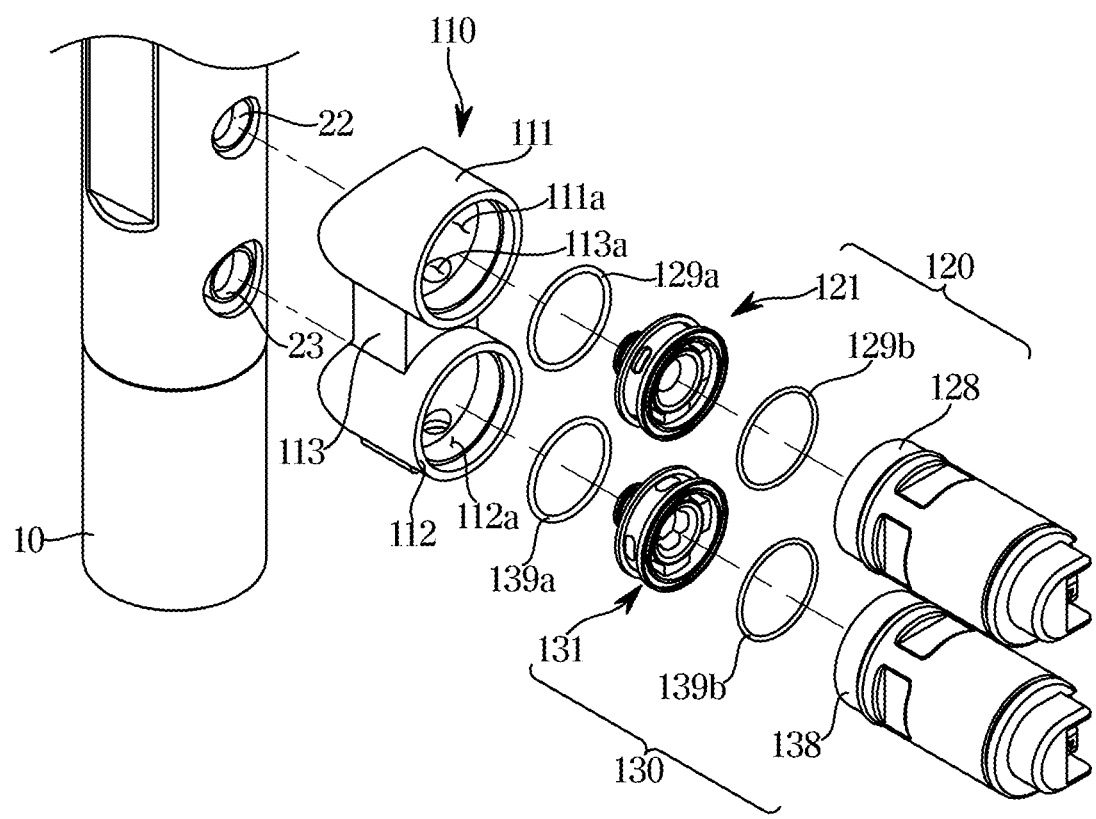
FIG. 3 is an exploded perspective view illustrating that a rebound solenoid valve and a compression solenoid valve are coupled to a post port provided in the continuous damping control shock absorber according to the first embodiment of the disclosure.
Figure 4:
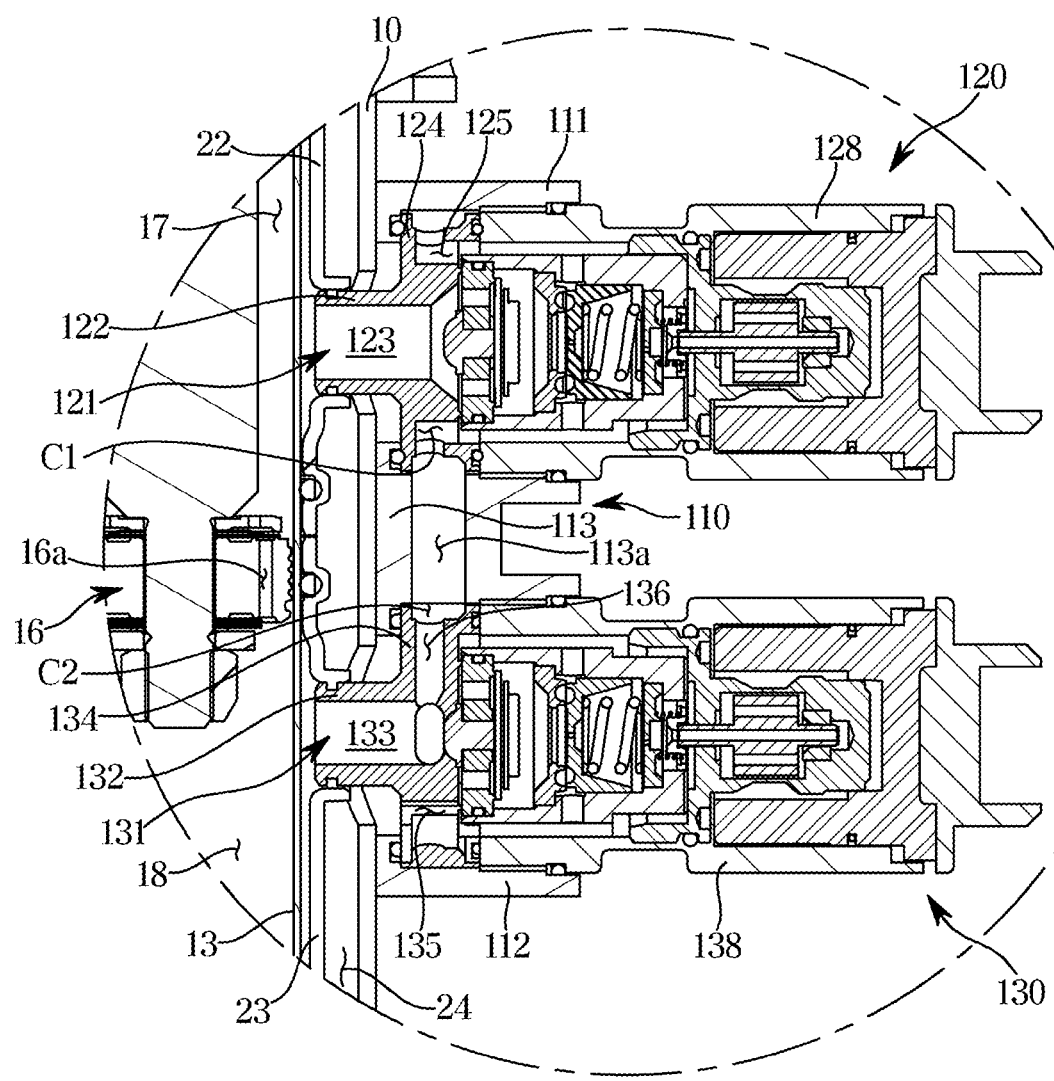
FIG. 4 is an assembly cross-sectional view of FIG. 3.
Figure 5:
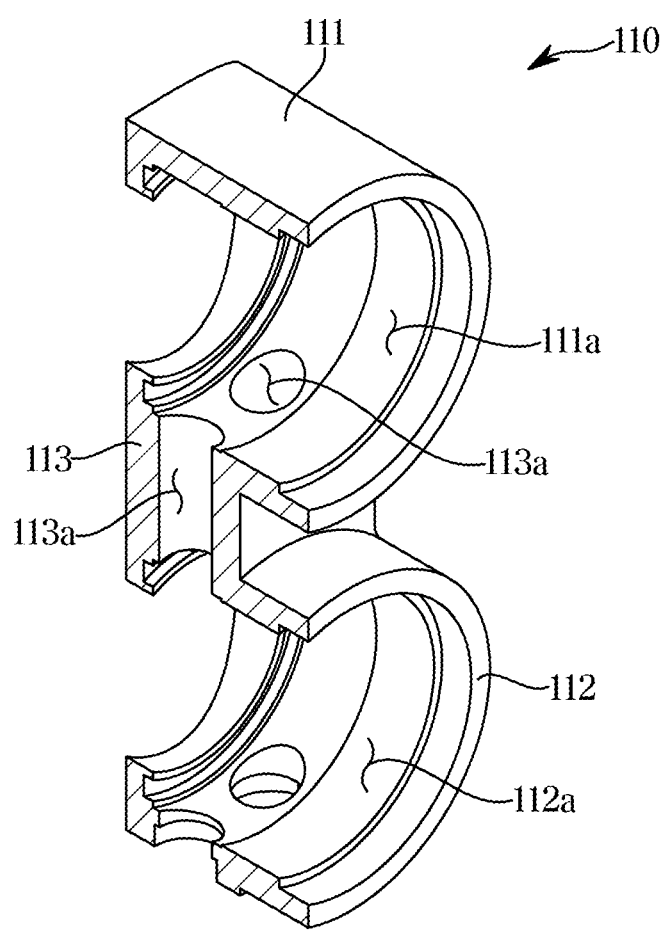
FIG. 5 is a cut-away perspective view of the post port provided in the continuous damping control shock absorber according to the first embodiment of the disclosure.
Figure 6:
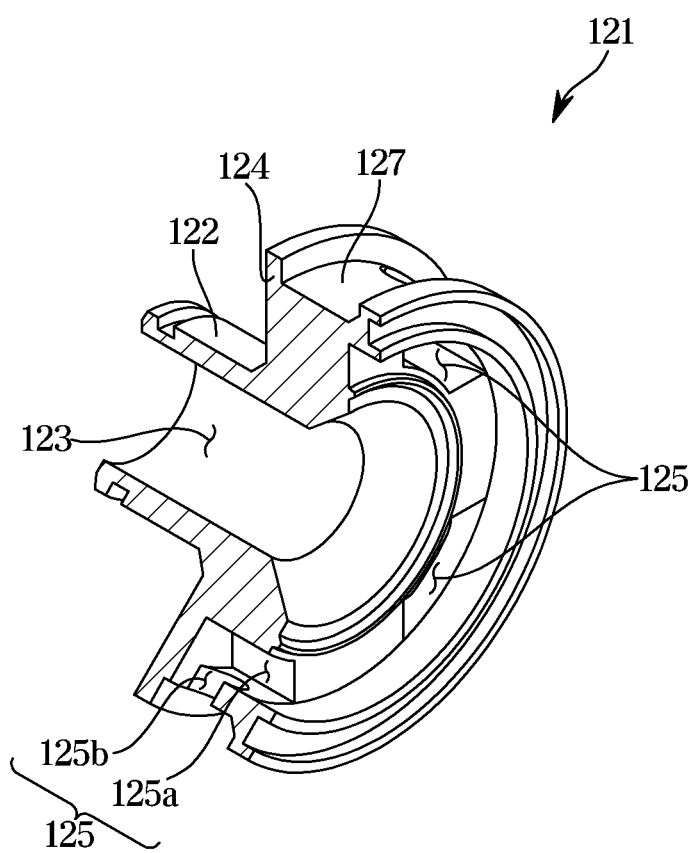
FIG. 6 is a cut-away perspective view of a rebound port provided in the continuous damping control shock absorber according to the first embodiment of the disclosure.
Figure 7:
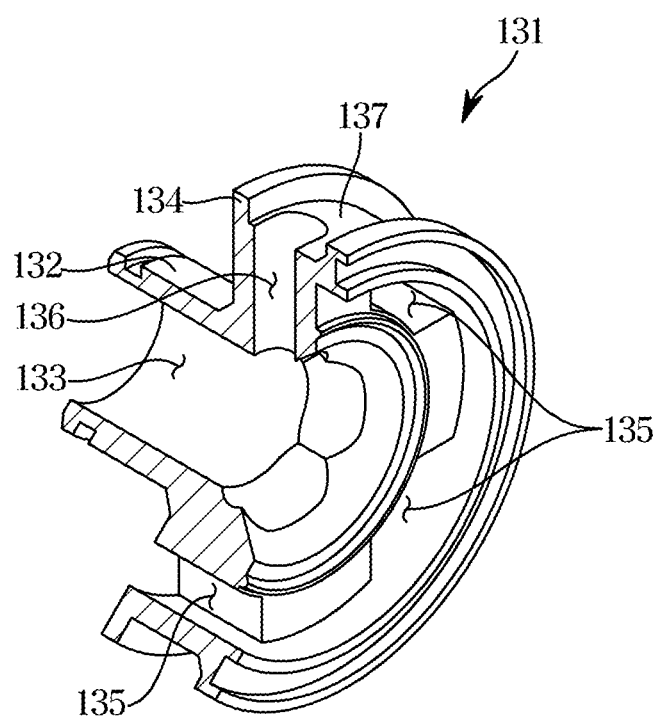
FIG. 7 is a cut-away perspective view of a compression port provided in the continuous damping control shock absorber according to the first embodiment of the disclosure.

FIG. 3 is an exploded perspective view illustrating that a rebound solenoid valve and a compression solenoid valve are coupled to a post port provided in the continuous damping control shock absorber according to the first embodiment of the disclosure, FIG. 4 is an assembly cross-sectional view of FIG. 3, FIG. 5 is a cut-away perspective view of the post port provided in the continuous damping control shock absorber according to the first embodiment of the disclosure, FIG. 6 is a cut-away perspective view of a rebound port provided in the continuous damping control shock absorber according to the first embodiment of the disclosure, and FIG. 7 is a cut-away perspective view of a compression port provided in the continuous damping control shock absorber according to the first embodiment of the disclosure.

Referring to FIGS. 3 to 7, the continuous damping control shock absorber 100 according to an embodiment of the disclosure may include the post port 110, the rebound solenoid valve 120 coupled to the post port 110, and the compression solenoid coupled to the post port 110.

The post port 110 is mounted on the outer side of the base shell 10. The post port 110 may include a first coupling part 111 to which the rebound solenoid valve 120 is coupled, a second coupling part 112 to which the compression solenoid valve 130 is coupled, and a connection part 113 connecting the first coupling part 111 and the second coupling part 112 and having at least one communication hole 113a for directly communicating the rebound solenoid valve 120 and the compression solenoid valve 130.

The first coupling part 111 has a hollow portion to form a first receiving space 111a to which the rebound solenoid valve 120 is coupled. Accordingly, a rebound port 121 of the rebound solenoid valve 120, which will be described later, is coupled to the rebound separator tube 22 through the first receiving space 111a of the first coupling part 111, and one end of a rebound valve housing 128 is coupled to the first receiving space 111a.

The second coupling part 112 has a hollow portion to form a second receiving space 112a to which the compression solenoid valve 130 is coupled. Accordingly, a compression port 131 of the compression solenoid valve 130, which will be described later, is coupled to the compression separator tube 23 through the second receiving space 112a of the second coupling part 112, and one end of a compression valve housing 138 is coupled to the second receiving space 112a.

The connection part 113 is disposed between the first and second coupling parts 111 and 112 and may be integrally formed with the first and second coupling parts 111 and 112 to have one body. The communication hole 113a formed in the connection part 113 is provided to communicate the first receiving space 111a and the second receiving space 112a. That is, as the first coupling part 111 and the second coupling part 112 are disposed to be spaced apart by a predetermined distance in a vertical direction to have axes parallel to each other, the communication hole 113a may be formed to be orthogonal to the central axes of the first and second coupling parts 111 and 112. As shown in the drawings, although two of the communication holes 113a are formed in the vertical direction, the number of communication holes 113a is not limited thereto, and the number and shape of the communication holes 113a may be selectively changed as long as the amount of oil that is discharged from the rebound solenoid valve 120 may be sufficiently guided toward the compression solenoid valve 130.

A hole, which is formed on a lower side of the second coupling part 112 (see FIG. 5: no reference numeral) is formed by processing to form the communication hole 113a in the post port 110 from the outside, may be sealed through a separate plug member or the like after the communication hole 113 is processed.

By coupling the post port 110 to the base shell 10 in a state in which the rebound solenoid valve 120 and the compression solenoid valve 130 are coupled to the post port 110 or by coupling the post port 110 to the base shell 10 and then coupling the rebound solenoid valve 120 and the compression solenoid valve 130 to the post port 110, ease of mounting may be ensured.

The rebound solenoid valve 120 is coupled to the rebound separator tube 22 in a state of being coupled to the first coupling part 111 and configured such that oil in the rebound chamber 17 transferred from the rebound separator tube 22 during the rebound stroke circulates therethrough and is transmitted to the compression solenoid valve 130 through the communication hole 113a. The oil transferred to the compression solenoid valve 130 is guided to the compression chamber 18, and a structure therefor will be described again below.

The rebound solenoid valve 120 may include the rebound port 121 coupled to the rebound separator tube 22 and the rebound valve housing 128 forming an outer appearance of the rebound solenoid valve 120 and coupled to the first coupling part 111. In this case, the rebound solenoid valve 120 has a structure in which oil is introduced only through the rebound port 121 and reverse flow of oil in the introduced direction is prevented. The rebound port 121 and the rebound valve housing 128 are coupled in the first receiving space 111a of the first coupling part 111 to close an opening of the other side of the first coupling part 111.

The rebound port 121 may include a first body part 122 coupled to the rebound separator tube 22 and having a central hollow portion forming a first rebound hole 123, and a first flange part 124 extending radially from the first body part 122. The first body part 122 and the first flange part 124 may be integrally formed to have one body.

One side of the first body part 122 may be coupled to the rebound separator tube 22, and the other side thereof may be in face-contact with the rebound valve housing 128 to be closely coupled to the rebound valve housing 128. Accordingly, oil transferred from the rebound chamber 17 through the first rebound hole 123 during the rebound stroke may be guided in a direction of directing to the rebound valve housing 128 (right direction based on the rebound port shown in FIG. 4) and may circulate through the rebound solenoid valve 120 and be discharged.

In the first flange part 124, a second rebound hole 125 is formed to guide the oil discharged from the rebound solenoid valve 120 to the communication hole 113a.

The second rebound hole 125 may include a first rebound connection hole 125a formed in a direction of directing to the other of the first flange part 124 from one side of the first flange part 124 (left direction based on the rebound port shown in FIG. 4), and a second rebound connection hole 125b formed on an outer circumferential surface of the first flange part 124 to be in communication with the first rebound connection hole 125a. A plurality of the second rebound holes 125 may be formed at regular intervals along a circumferential direction of the first flange part 124.

The first flange part 124 has a rebound groove 127 formed to be concave along the outer circumferential surface thereof. The rebound groove 127 may be formed at a position corresponding to the communication hole 113*a* to form a first connection chamber C1 between the rebound groove 127 and the communication hole 113*a*. The second rebound connection hole 125*b* may be formed on the rebound groove 127. Accordingly, oil discharged from the plurality of second rebound holes 125, that is, the second rebound connection hole 125*b*, may be guided to the communication hole 113*a* through the first connection chamber C1.

The rebound port 121 may be coupled in the first coupling part 111 so that oil circulated and discharged from the rebound chamber 17 to the rebound solenoid valve 120 is guided to the communication hole 113*a* without leakage. For example, the rebound port 121 is provided with sealing members 129*a* and 129*b* at one end and the other end of the first flange part 124, respectively, so that one end and the other end of the first flange part 124 may be face-sealed with the first coupling part 111 and the rebound valve housing 128, respectively. Therefore, during the rebound stroke, oil discharged from the rebound solenoid valve 120 passes through the communication hole 113*a* through the second rebound hole 123 formed in the first flange part 124 and is guided to the compression solenoid valve 130 side.

The compression solenoid valve 130 may include the compression port 131 coupled to the compression separator tube 23 and the compression valve housing 138 forming an outer appearance of the compression solenoid valve 130 and coupled to the second coupling part 112. In this case, the compression solenoid valve 130 has a structure in which oil is introduced only through the compression port 131 and reverse flow in the introduced direction is prevented. The compression port 131 and the compression valve housing 138 are coupled in the second receiving space 112*a* of the second coupling part 112 to close an opening of the other side of the second coupling part 112.

The compression port 131 may include a second body part 132 coupled to the compression separator tube 23 and having a central hollow portion forming a first compression hole 133, and a second flange part 134 extending radially from the second body part 132. The second body part 132 and the second flange part 134 may be integrally formed to have one body.

One side of the second body part 132 may be coupled to the compression separator tube 23, and the other side thereof may be in face-contact with the compression valve housing 138 to be closely coupled to the compression valve housing 138. Accordingly, oil transferred from the compression chamber 18 through the first compression hole 133 during the compression stroke may be guided in a direction of directing to the compression valve housing 138 (right direction based on the compression port shown in FIG. 4) and may circulate through the compression solenoid valve 130 and be discharged.

In the second flange part 134, a second compression hole 135 to guide oil discharged from the compression solenoid valve 130 to the reservoir chamber 24, and a third compression hole 136 to guide oil discharged from the rebound solenoid valve 120 to the first compression hole 133 may be formed.

The second compression hole 135 may be formed to penetrate in a direction of directing to the other side of the second flange part 134 from one side of the second flange part 134 (left direction based on the compression port shown in FIG. 4) to be in communication with the reservoir chamber 24. A plurality of the second compression holes 135 may be formed at regular intervals along a circumferential direction of the second flange part 134. Accordingly, during the compression stroke, oil in the compression chamber 18 circulates in the compression solenoid valve 130 through the first compression hole 133 of the compression port 131 coupled to the compression separator tube 23, and oil discharged from the compression solenoid valve 130 is guided to the reservoir chamber 24 through the second compression hole 135.

The third compression hole 136 is formed to be in communication with the first compression hole 133 so that oil discharged through the communication hole 113*a* during the rebound stroke is guided to the first compression hole 133. A plurality of the third compression holes 136 may be formed along an outer circumferential surface of the second flange part 134 and may be formed to penetrate in the vertical direction, that is, toward the first compression hole 133 to be in communication with the first compression hole 133 formed to penetrate a central portion of the compression port 131. Accordingly, oil discharged from the rebound solenoid valve 120 during the rebound stroke is guided to the first compression hole 133 through the communication hole 113*a* and the third compression hole 136, and thus the oil is finally guided to the compression chamber 18.

As described above, because the rebound solenoid valve 120 and the compression solenoid valve 130 need to be configured to independently generate damping forces during the rebound stroke and the compression stroke, the second compression hole 135 and the third compression hole 136 may be disposed not to overlap each other and to be biased each other. That is, the compression port 131 serves to guide oil to flow into the compression chamber 18 through the third compression hole 136 and the first compression hole 131 during the rebound stroke, and to guide oil to flow into the reservoir chamber 24 through the first compression hole 133 and the second compression hole 135 during the compression stroke.

The second flange part 134 has a compression groove 137 formed to be concave along the outer circumferential surface thereof. The compression groove 137 may be formed at a position corresponding to the communication hole 113*a* to form a second connection chamber C2 between the compression groove 137 and the communication hole 113*a*. The third compression hole 136 may be formed on the compression groove 137. Accordingly, oil discharged from the communication hole 113*a* is guided to the plurality of third compression holes 136 through the second connection chamber C2 and is introduced into the first compression hole 133.

The compression port 131 may be coupled in the second coupling part 112 so that oil circulated and discharged from the compression chamber 18 to the compression solenoid valve 130 is guided to the reservoir chamber 24 without leakage. For example, the compression port 131 is provided with sealing members 139*a* and 139*b* at one end and the other end of the second flange part 134, respectively, so that one end and the other end of the second flange part 134 may be face-sealed with the second coupling part 112 and one surface of the compression valve housing 138, respectively. Therefore, during the compression stroke, oil discharged from the compression solenoid valve 130 is guided to the reservoir chamber 24 through the second compression hole 135 formed in the second flange part 134, and during the rebound stroke, oil discharged from the rebound solenoid valve 120 may be guided to the first compression hole 133 through the communication hole 113*a* and through the third compression hole 136.

Hereinafter, an operation of the continuous damping control shock absorber 100 according to the first embodiment of the disclosure will be described.

Figure 8:
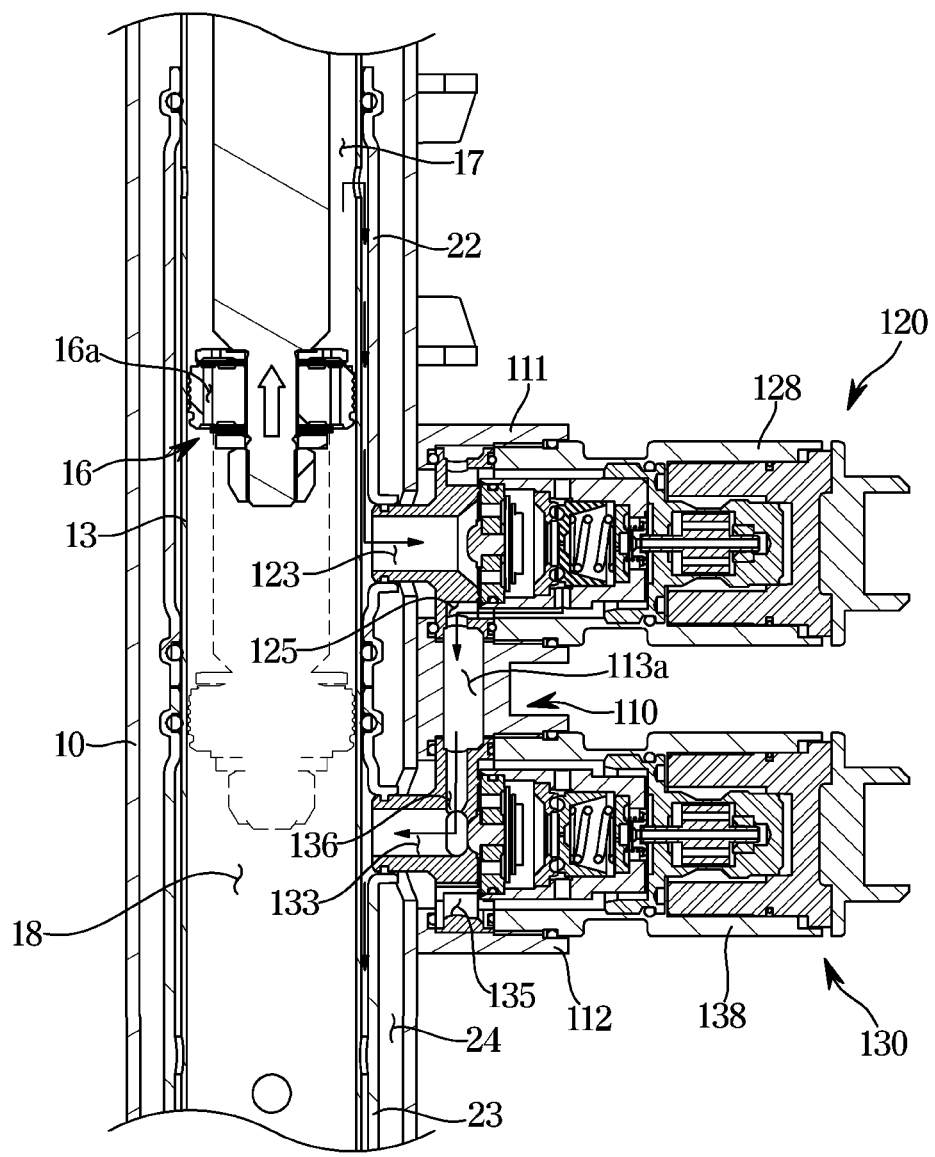
FIG. 8 is a view illustrating a flow of oil during a rebound stroke by the continuous damping control shock absorber according to the first embodiment of the disclosure.

FIG. 8 is a view illustrating a flow of oil during a rebound stroke by the continuous damping control shock absorber according to the first embodiment of the disclosure.

Referring to FIG. 8, when the piston rod 12 ascends during the rebound stroke, the rebound chamber 17 becomes a high pressure, and the compression chamber 18 becomes a low pressure. In this case, a part of oil in the rebound chamber 17 is guided to the first rebound hole 123 of the rebound port 121 coupled to the rebound separator tube 22 through the inner hole 13a formed on the upper side of the inner tube 13. Also, a part of the oil in the rebound chamber 17 is introduced into the compression chamber 18 through the oil passage 16a formed in the piston valve 16, thereby generating a damping force. The oil guided to the first rebound hole 123 circulates through the rebound solenoid valve 120, passes through the second rebound hole 125, the communication hole 113a, and the third compression hole 136 in sequence, and is introduced into the compression chamber 18 through the first compression hole 133, thereby controlling the damping force.

Figure 9:
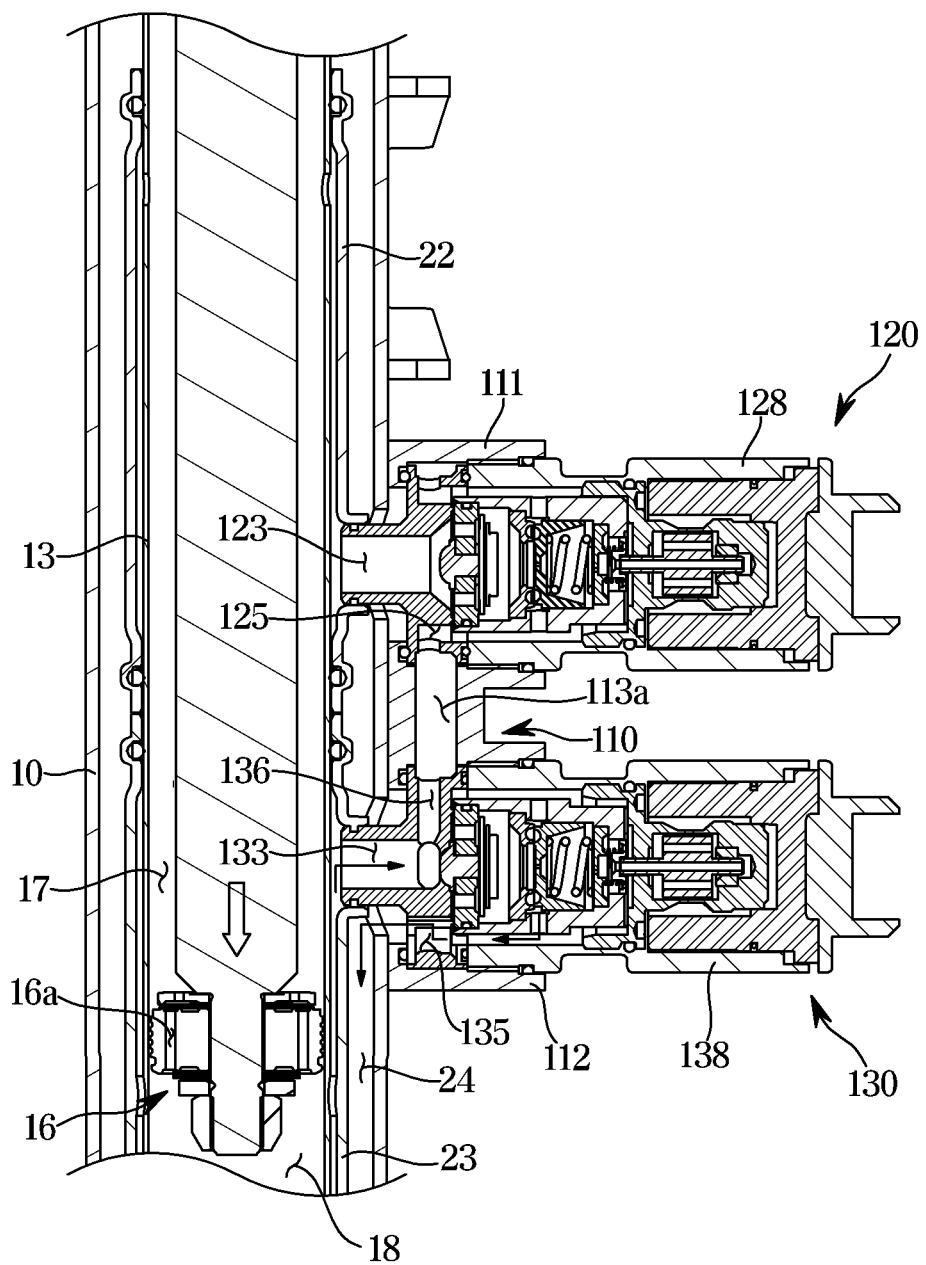
FIG. 9 is a view illustrating a flow of oil during a compression stroke by the continuous damping control shock absorber according to the first embodiment of the disclosure.

FIG. 9 is a view illustrating a flow of oil during a compression stroke by the continuous damping control shock absorber according to the first embodiment of the disclosure.

Referring to FIG. 9, when the piston rod 12 descends during the compression stroke, the compression chamber 18 becomes a high pressure, and the rebound chamber 17 becomes a low pressure. In this case, a part of oil in the compression chamber 18 is guided to the first compression hole 133 of the compression port 131 coupled to the compression separator tube 23 through the inner hole 13b formed on the lower side of the inner tube 13. Also, a part of the oil in the compression chamber 18 is introduced into the rebound chamber 17 through the oil passage 16a formed in the piston valve 16, thereby generating a damping force. The oil guided to the first compression hole 133 circulates through the compression solenoid valve 130 and is introduced into the reservoir chamber 24 through the second compression hole 135, thereby controlling the damping force.

As described above, as the rebound solenoid valve 120 and the compression solenoid valve 130 are connected through the communication hole 113a formed in the post port 110, and the first to third compression holes 133, 135, and 136 formed in the compression port 131 allow the oil discharged from the rebound solenoid valve 120 during the rebound stroke to be guided to the compression chamber 18 through the third compression hole 136 and the first compression hole 133 and allow the oil in the compression chamber 18 during the compression stroke to be guided to the reservoir chamber 24 through the first compression hole 133 and the second compression hole 135, the rebound solenoid valve 120 and the compression solenoid valve 130 may independently generate damping forces during the rebound stroke and the compression stroke.

Although the disclosure illustrates and describes that the rebound solenoid valve 120 and the compression solenoid valve 130 are each coupled to the post port 110 provided in one block shape and connected through a communication hole 113a, and are coupled to the base shell 10 by the post port 110, the disclosure is not limited thereto, and a mechanical flow path may be formed between the rebound solenoid valve 120 and the compression solenoid valve 130 in various methods. For example, a rebound solenoid valve 220 and a compression solenoid valve 230 may be each coupled to the base shell 10, and the rebound solenoid valve 220 and the compression solenoid valve 230 may be provided to be in communication with each other, thereby independently generating damping forces. A continuous damping control shock absorber 200 as above is illustrated in FIGS. 10 to 16.

Figure 10:
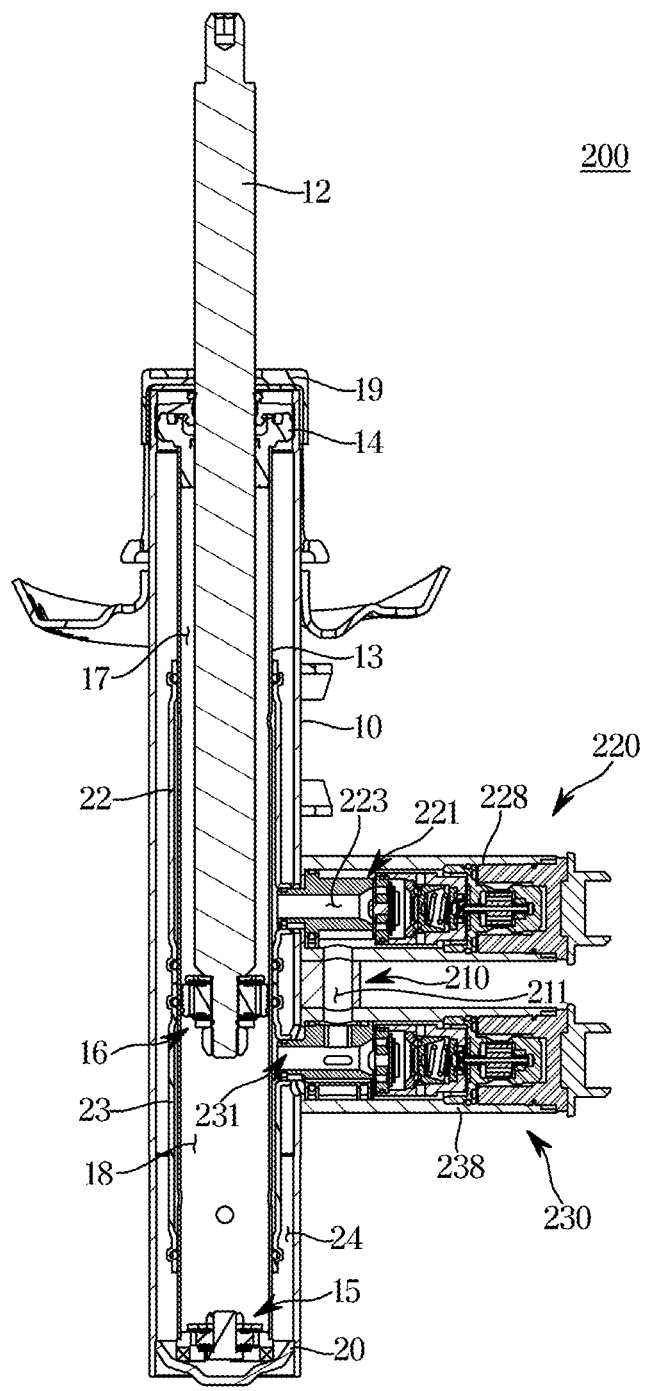
FIG. 10 is a cross-sectional view of a continuous damping control shock absorber having a structure of a dual solenoid valve according to a second embodiment of the disclosure.
Figure 11:
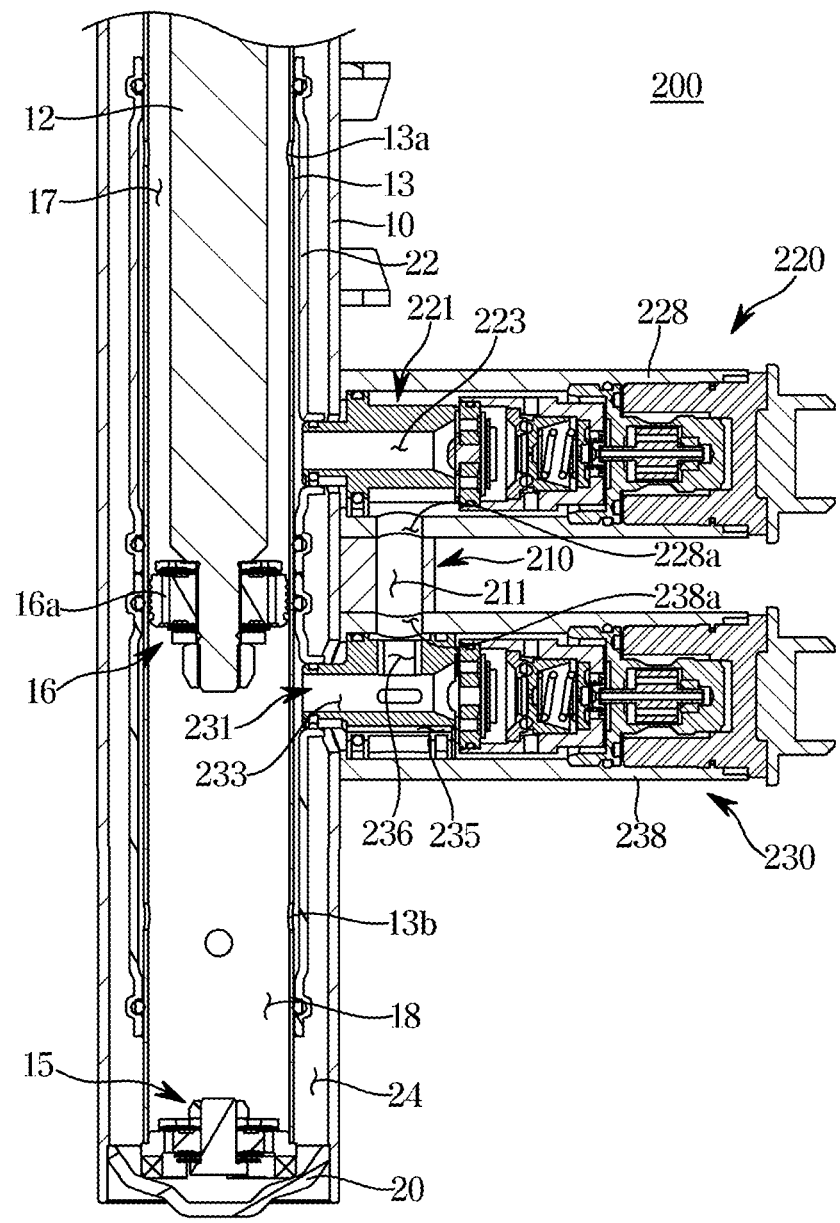
FIG. 11 is an enlarged view of a main part of FIG. 10.
Figure 12:
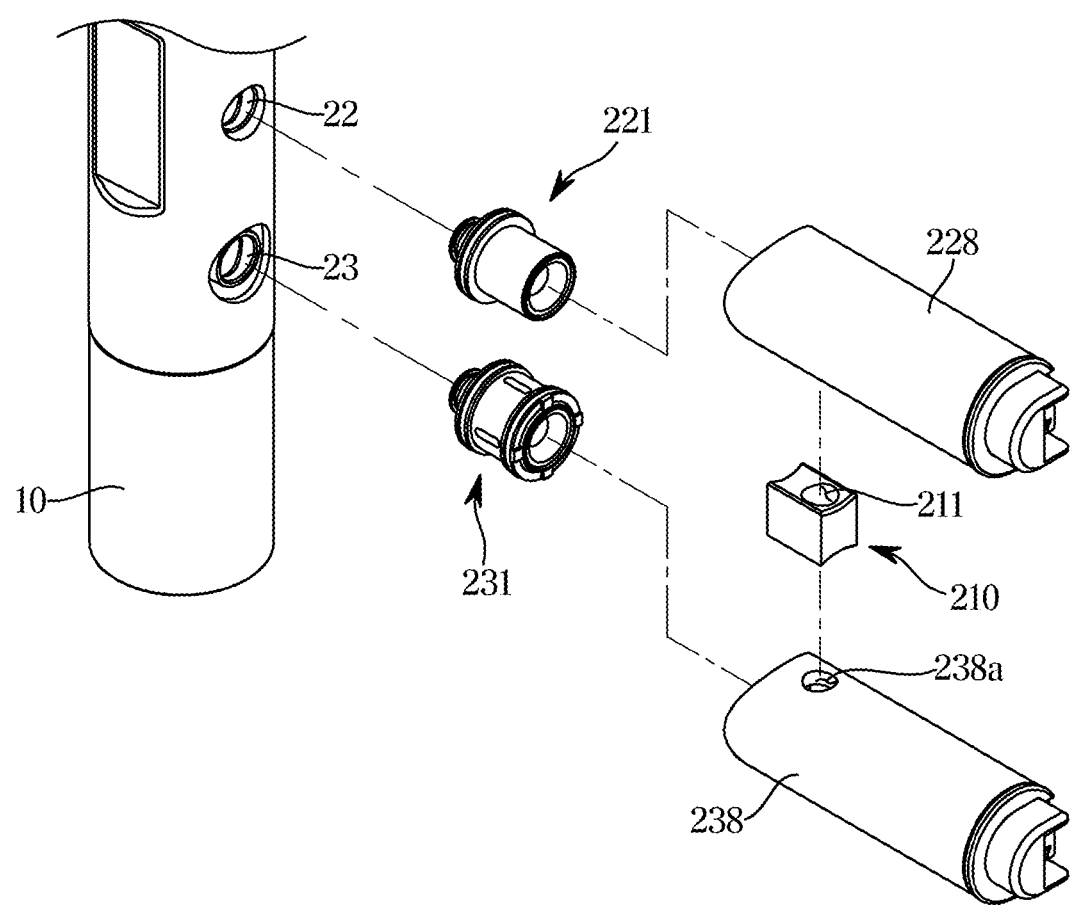
FIG. 12 is an exploded perspective view illustrating that a bridge port, a rebound solenoid valve and a compression solenoid valve are coupled to a base shell of the continuous damping control shock absorber according to the second embodiment of the disclosure.
Figure 13:
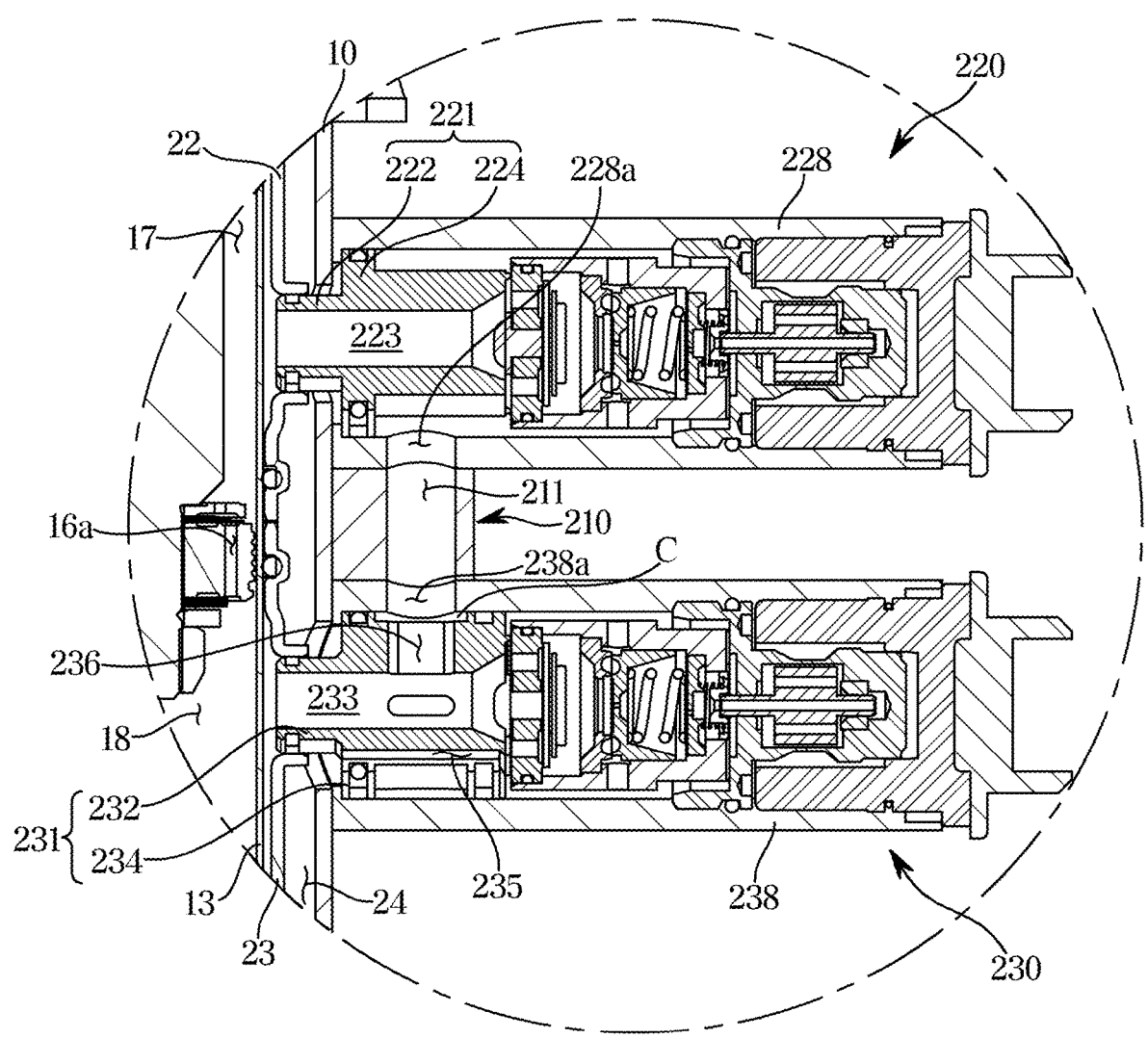
FIG. 13 is an assembly cross-sectional view of FIG. 12.
Figure 14:
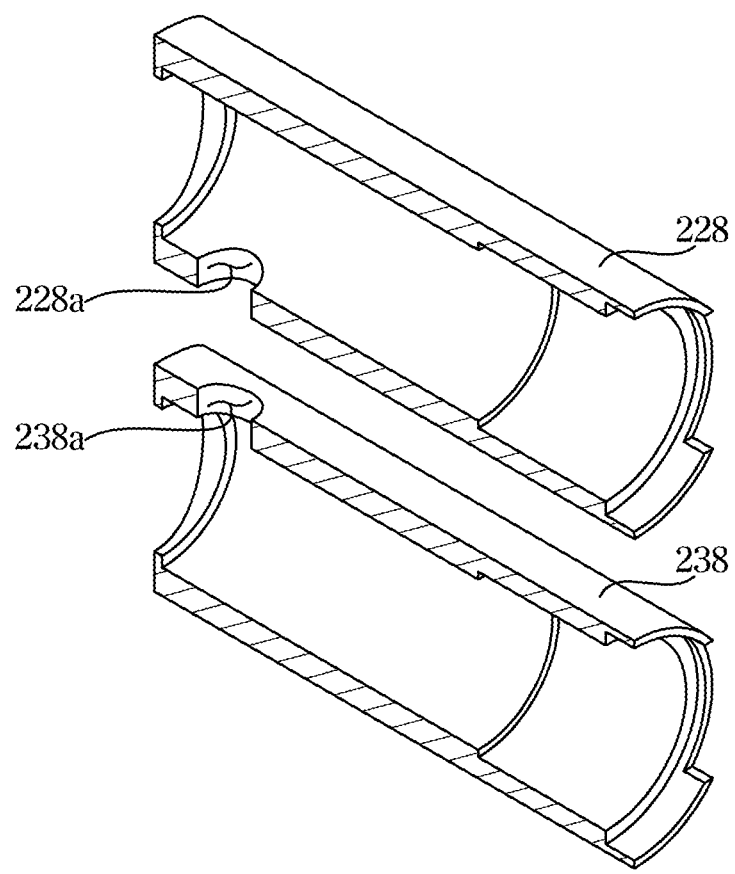
FIG. 14 is a cut-away perspective view of a solenoid valve housing provided in the continuous damping control shock absorber according to the second embodiment of the disclosure.
Figure 15:
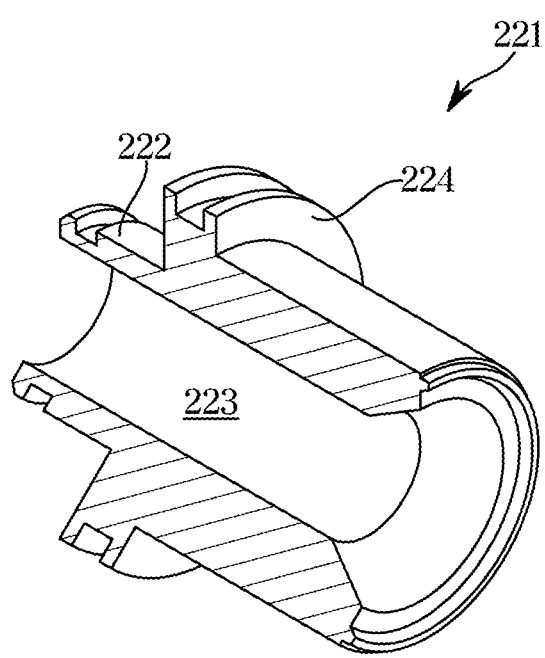
FIG. 15 is a cut-away perspective view of a rebound port provided in the continuous damping control shock absorber according to the second embodiment of the disclosure.
Figure 16:
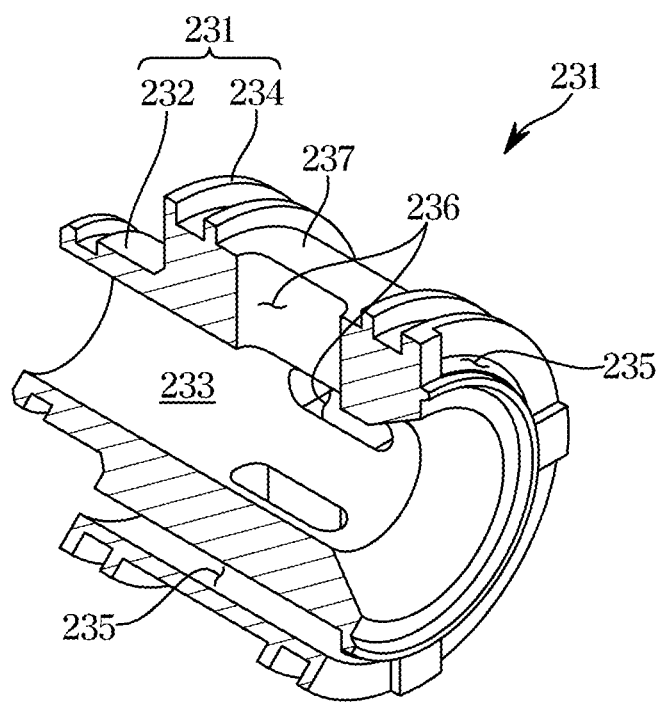
FIG. 16 is a cut-away perspective view of a compression port provided in the continuous damping control shock absorber according to the second embodiment of the disclosure.

FIG. 10 is a cross-sectional view of a continuous damping control shock absorber having a structure of a dual solenoid valve according to a second embodiment of the disclosure, FIG. 11 is an enlarged view of a main part of FIG. 10, FIG. 12 is an exploded perspective view illustrating that a bridge port, a rebound solenoid valve and a compression solenoid valve are coupled to a base shell of the continuous damping control shock absorber according to the second embodiment of the disclosure, FIG. 13 is an assembly cross-sectional view of FIG. 12, FIG. 14 is a cut-away perspective view of a solenoid valve housing provided in the continuous damping control shock absorber according to the second embodiment of the disclosure, FIG. 15 is a cut-away perspective view of a rebound port provided in the continuous damping control shock absorber according to the second embodiment of the disclosure, and FIG. 16 is a cut-away perspective view of a compression port provided in the continuous damping control shock absorber according to the second embodiment of the disclosure. Herein, the same reference numerals as those in the drawings of the first embodiment described above indicate members having the same function.

Referring to FIGS. 10 to 16, the continuous damping control shock absorber 200 according to a second embodiment of the disclosure may include the rebound solenoid valve 220 coupled to the outer side of the base shell 10, the compression solenoid valve 230 coupled to the outer side of the base shell 10 to be spaced apart from the rebound solenoid valve 220 by a predetermined distance, and a bridge port 210 mounted on the outer side of the base shell 10 to be interposed between the rebound solenoid valve 220 and the compression solenoid valve 230.

Like the first embodiment described above, the continuous damping control shock absorber 200 according to the second embodiment is characterized by having a mechanical flow path that allows oil in the rebound chamber 17 to circulate through the rebound solenoid valve 220 and flow to the compression chamber 18 during a rebound stroke and allows oil in the compression chamber 18 to circulate through the compression solenoid valve 230 and flow to the reservoir chamber 24 during a compression stroke.

The bridge port 210 has a communication hole 211 to communicate the rebound solenoid valve 220 and the compression solenoid valve 230. The bridge port 210 is mounted on the outer side of the base shell 10 and configured such that the rebound solenoid valve 220 and the compression solenoid valve 230 are coupled thereto by direct contact. As illustrated in the drawings, as the rebound solenoid valve 220 and the compression solenoid valve 230 are disposed to be spaced apart by a predetermined distance in a vertical direction to have axes parallel to each other, the communication hole 211 may be formed in the vertical direction to allow oil discharged from the rebound solenoid valve 220 to flow directly toward the compression solenoid valve 230.

By such the bridge port 210, a first connection hole 228a may be formed in a position of a rebound valve housing 228, which will be described later, corresponding to one side of the communication hole 211, and a second connection hole 238a may be formed at a position of a compression valve housing 238 corresponding to the other side of the communication hole 211.

The rebound solenoid valve 220 includes a rebound port 221 coupled to the rebound separator tube 22, and the rebound valve housing 228 forming an outer appearance of the rebound solenoid valve 220 and coupled to the outer side of the base shell 10, and the rebound valve housing 228 is provided with the first connection hole 228a at a position corresponding to an upper side of the communication hole 211, which is the one side of the communication hole 211. In this case, the rebound solenoid valve 220 has a structure in which oil is introduced only through the rebound port 221 and reverse flow of oil in the introduced direction is prevented.

The rebound port 221 may include a first body part 222 coupled to the rebound separator tube 22 and having a central hollow portion forming a first rebound hole 223, and a first flange part 224 extending radially from the first body part 222. The first body part 122 and the first flange part 124 may be integrally formed to have one body.

One side of the first body part 222 may be coupled to the rebound separator tube 22, and the other side thereof may be in close contact with an inner surface of the rebound valve housing 228 to be coupled to the rebound valve housing 228. Accordingly, oil transferred from the rebound chamber 17 through the rebound hole 223 during the rebound stroke may be guided in a direction of directing to the rebound valve housing 228 (right direction based on the rebound port shown in FIG. 13) and may circulate through the rebound solenoid valve 220 and be discharged through the first connection hole 228a of the rebound valve housing 228. That is, the oil discharged from the rebound solenoid valve 220 is guided to the compression solenoid valve 230 side through the communication hole 211.

The first flange part 224 is configured to seal between the base shell 10 and the rebound valve housing 228 so that oil discharged by circulating through the rebound solenoid valve 220 through the rebound hole 223 is guided to the communication hole 211 through the first connection hole 228a.

The compression solenoid valve 230 may include a compression port 231 coupled to the compression separator tube 23 and the compression valve housing 238 forming an outer appearance of the compression solenoid valve 230 and coupled to the outer side of the base shell 10, and the compression valve housing 238 may be provided with the second connection hole 238a at a position corresponding to a lower side of the communication hole 211, which is the other side of the communication hole 211. In this case, the compression solenoid valve 230 has a structure in which oil is introduced only through the compression port 231 and reverse flow of oil in the introduced direction is prevented.

The compression port 231 may include a second body part 232 coupled to the compression separator tube 23 and having a central hollow portion forming a first compression hole 233, and a second flange part 234 extending radially from the second body part 232. The second body part 232 and the second flange part 234 may be integrally formed to have one body.

One side of the second body part 232 may be coupled to the compression separator tube 23, and the other side thereof may be in close contact with an inner surface of the compression valve housing 238 to be coupled to the compression valve housing 238. Accordingly, oil transferred from the compression chamber 18 through the first compression hole 233 during the compression stroke may be guided in a direction of directing to the compression valve housing 238 (right direction based on the compression port shown in FIG. 13) and may circulate through the compression solenoid valve 230 and be discharged.

In the second flange part 234, a second compression hole 235 to guide oil discharged from the compression solenoid valve 230 to the reservoir chamber 24, and a third compression hole 236 to guide oil discharged from the rebound solenoid valve 220 to the first compression hole 233 may be formed.

The second compression hole 235 may be formed to penetrate in a direction of directing to the other side of the second flange part 234 from one side of the second flange part 234 (left direction based on the compression port shown in FIG. 13) to be in communication with the reservoir chamber 24. A plurality of the second compression holes 235 may be formed at regular intervals along a circumferential direction of the second flange part 234. Accordingly, during the compression stroke, oil in the compression chamber 18 circulates in the compression solenoid valve 230 through the first compression hole 233 of the compression port 231 coupled to the compression separator tube 23, and oil discharged from the compression solenoid valve 230 is guided to the reservoir chamber 24 through the second compression hole 235.

The third compression hole 236 is formed to be in communication with the first compression hole 233 so that oil discharged through the communication hole 211 during the rebound stroke is guided to the first compression hole 233. A plurality of the third compression holes 236 may be formed along an outer circumferential surface of the second flange part 234 and may be formed to penetrate in the vertical direction, that is, toward the first compression hole 233 to be in communication with the first compression hole 233 formed to penetrate a central portion of the compression port 231. Accordingly, as oil discharged from the rebound solenoid valve 220 during the rebound stroke is guided to the first compression hole 233 through the communication hole 211 and the third compression hole 236, the oil is finally guided to the compression chamber 18. In this case, the first connection hole 228a, the communication hole 211, the second connection hole 238a, and the third compression hole 236 may be arranged to be positioned on a straight line in the vertical direction to facilitate the flow of oil.

As described above, because the rebound solenoid valve 220 and the compression solenoid valve 230 need to be configured to independently generate damping forces during the rebound stroke and the compression stroke, the second compression hole 235 and the third compression hole 236 may be disposed not to overlap each other and to be biased each other. That is, the compression port 231 serves to guide oil to flow into the compression chamber 18 through the third compression hole 236 and the first compression hole 233 during the rebound stroke, and to guide oil to flow into the reservoir chamber 24 through the first compression hole 233 and the second compression hole 235 during the compression stroke.

The second flange part 234 has a compression groove 237 formed to be concave along the outer circumferential surface thereof. The compression groove 237 may be formed at a position corresponding to the communication hole 211 to form a connection chamber C between the compression groove 237 and the communication hole 211. The third compression hole 236 may be formed on the compression groove 237. Accordingly, oil discharged from the communication hole 211 is guided to the plurality of third compression holes 236 through the connection chamber C and is introduced into the first compression hole 233.

The compression port 231 may be configured such that leakage of oil, which circulates from the compression chamber 18 to the compression solenoid valve 230 and is discharged, is prevented and oil introduced through the communication hole 211 is prevented from leaking between the base shell 10 and the compression valve housing 238. For example, the compression port 231 is provided with sealing members (no reference numerals) at an outer circumferential surface of one end and an outer circumferential surface of the other end of the second flange part 234, respectively, to seal by being in contact with an inner surface of the compression valve housing 238. In this case, one end and the other end of the second flange part 234 may be provided such that the second connection hole 238a is positioned therebetween, and the compression groove 237 is formed therebetween. Therefore, during the compression stroke, oil discharged from the compression solenoid valve 230 is guided to the reservoir chamber 24 through the second compression hole 235 formed in the second flange part 234, and during the rebound stroke, oil discharged from the rebound solenoid valve 220 may be smoothly guided to the first compression hole 233 through the communication hole 211 and through the third compression hole 236 without leakage.

Hereinafter, an operation of the continuous damping control shock absorber 200 according to the second embodiment of the disclosure will be described.

Figure 17:
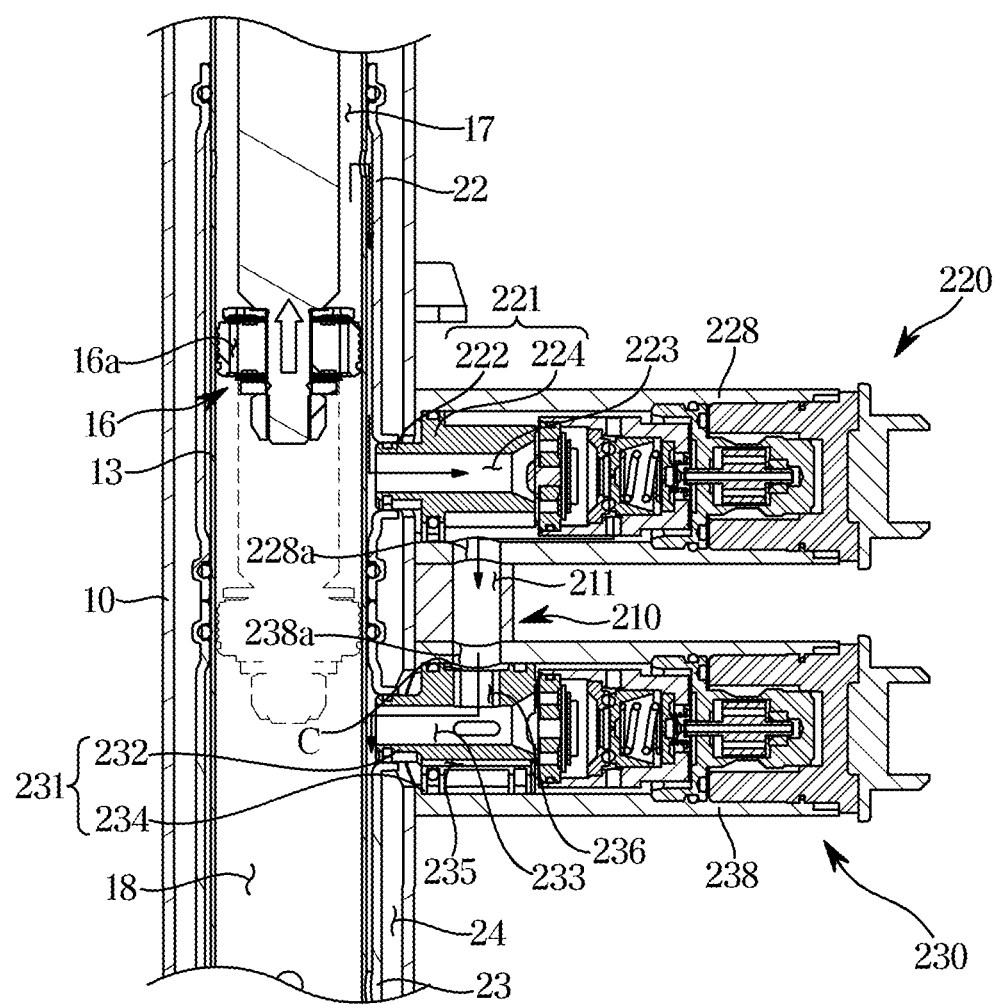
FIG. 17 is a view illustrating a flow of oil during a rebound stroke by the continuous damping control shock absorber according to the second embodiment of the disclosure.

FIG. 17 is a view illustrating a flow of oil during a rebound stroke by the continuous damping control shock absorber according to the second embodiment of the disclosure.

Referring to FIG. 17, when the piston rod 12 ascends during the rebound stroke, the rebound chamber 17 becomes a high pressure, and the compression chamber 18 becomes a low pressure. In this case, a part of oil in the rebound chamber 17 is guided to the rebound hole 223 of the rebound port 221 coupled to the rebound separator tube 22 through the inner hole 13a formed on the upper side of the inner tube 13. Also, a part of the oil in the rebound chamber 17 is introduced into the compression chamber 18 through the oil passage 16a formed in the piston valve 16, thereby generating a damping force. The oil guided to the rebound hole 223 circulates through the rebound solenoid valve 220, passes through the first connection hole 228a, the communication hole 211, the second connection hole 238a, and the third compression hole 236 in sequence, and is introduced into the compression chamber 18 through the first compression hole 233, thereby controlling the damping force.

Figure 18:
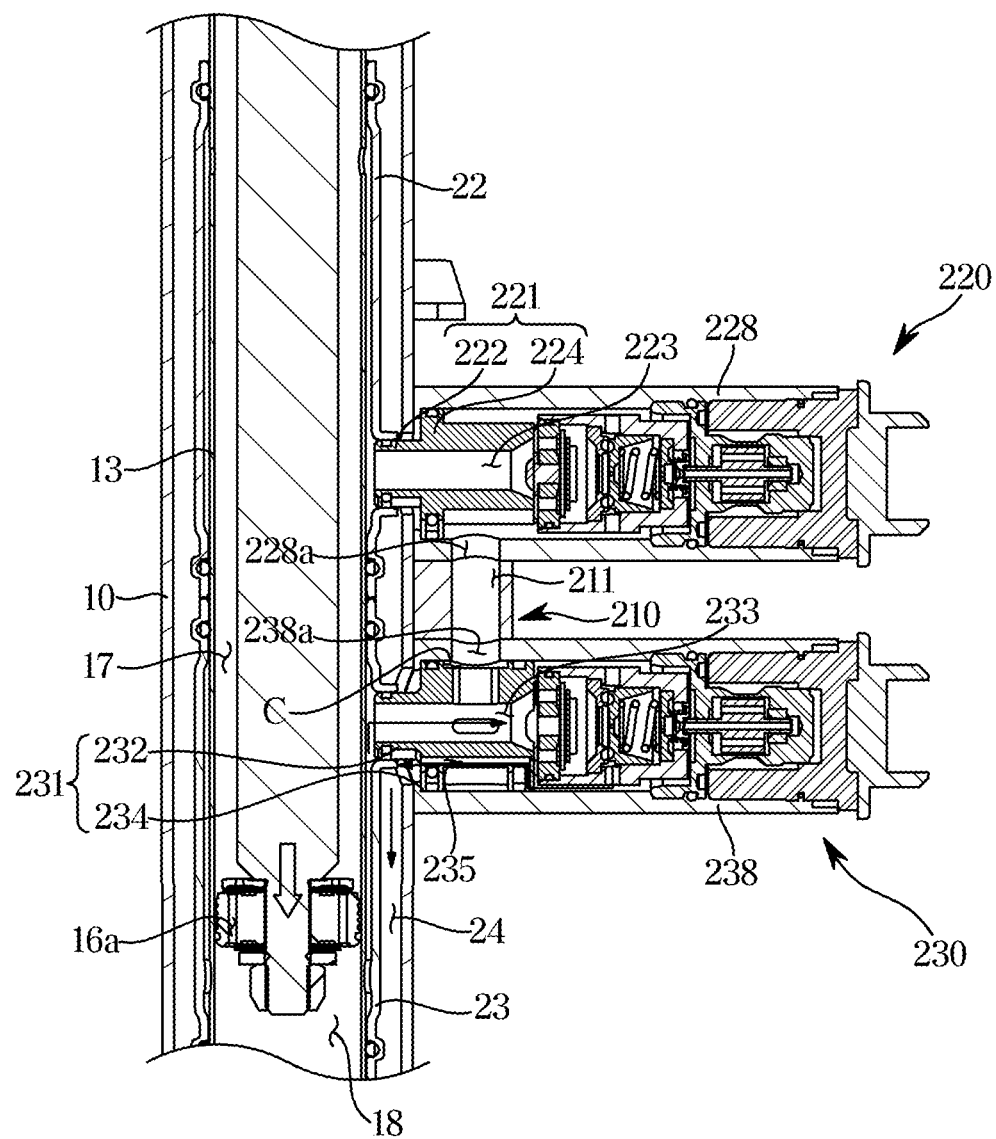
FIG. 18 is a view illustrating a flow of oil during a compression stroke by the continuous damping control shock absorber according to the second embodiment of the disclosure.

FIG. 18 is a view illustrating a flow of oil during a compression stroke by the continuous damping control shock absorber according to the second embodiment of the disclosure.

Referring to FIG. 18, when the piston rod 12 descends during the compression stroke, the compression chamber 18 becomes a high pressure, and the rebound chamber 17 becomes a low pressure. In this case, a part of oil in the compression chamber 18 is guided to the first compression hole 233 of the compression port 231 coupled to the compression separator tube 23 through the inner hole 13b formed on the lower side of the inner tube 13. Also, a part of the oil in the compression chamber 18 is introduced into the rebound chamber 17 through the oil passage 16a formed in the piston valve 16, thereby generating a damping force. The oil guided to the first compression hole 233 circulates through the compression solenoid valve 230 and is introduced into the reservoir chamber 24 through the second compression hole 235, thereby controlling the damping force.

As described above, as the rebound solenoid valve 220 and the compression solenoid valve 230 are connected through the communication hole 211 formed in the bridge port 210, and the first to third compression holes 233, 235, and 236 formed in the compression port 231 allow the oil discharged from the rebound solenoid valve 220 during the rebound stroke to be guided to the compression chamber 18 through the third compression hole 236 and the first compression hole 233 and allow the oil in the compression chamber 18 during the compression stroke to be guided to the reservoir chamber 24 through the first compression hole 233 and the second compression hole 235, the rebound solenoid valve 220 and the compression solenoid valve 230 may independently generate damping forces during the rebound stroke and the compression stroke.

Figure 19:
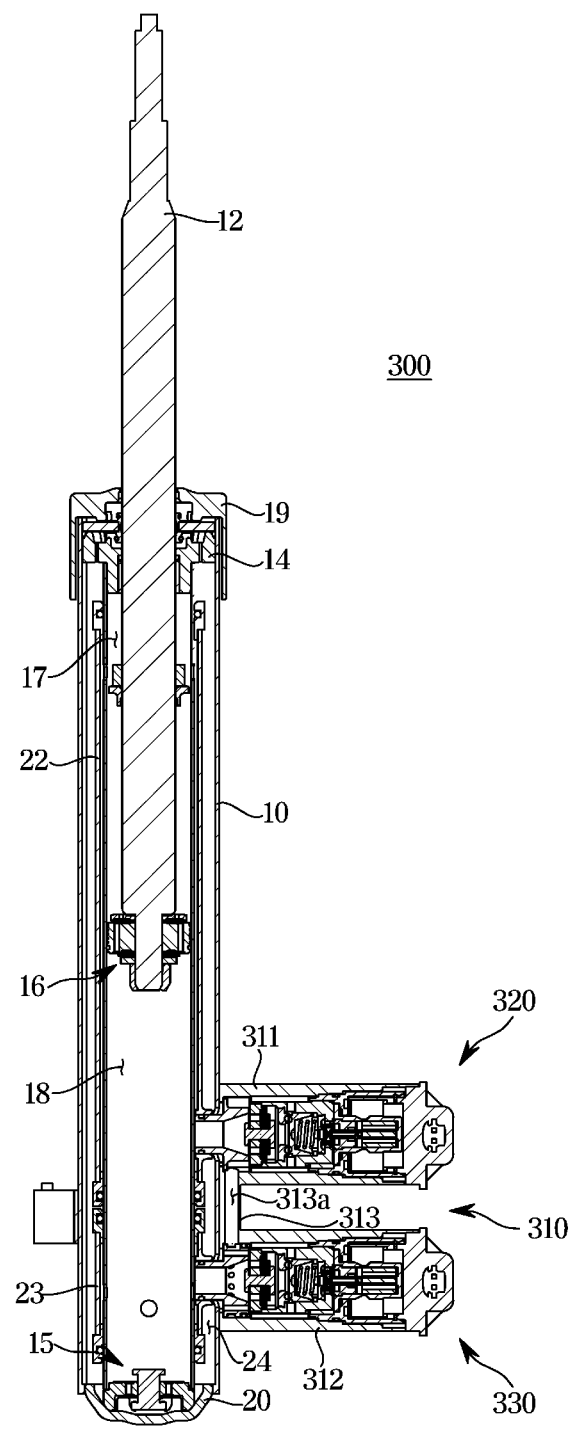
FIG. 19 is a cross-sectional view of a continuous damping control shock absorber having a structure of a dual solenoid valve according to a third embodiment of the disclosure.
Figure 20:
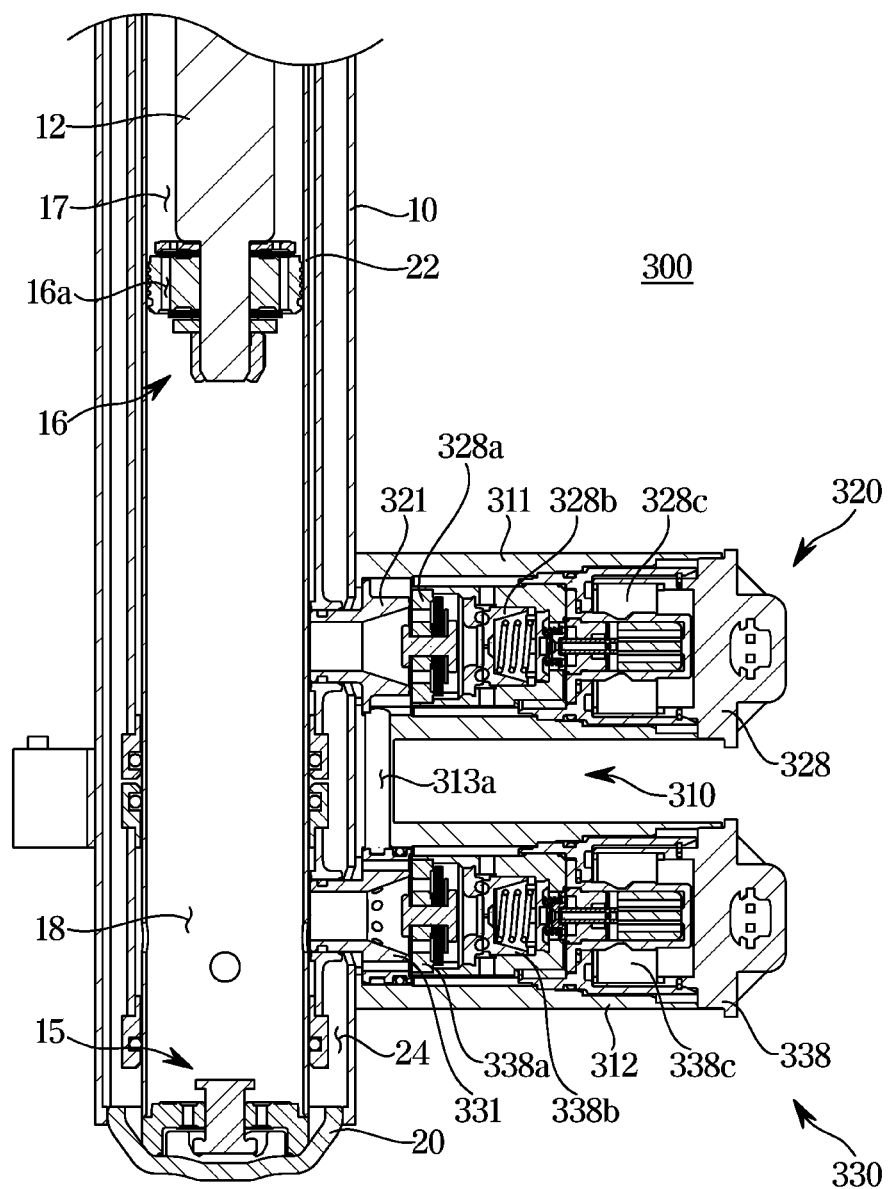
FIG. 20 is an enlarged view of a main part of FIG. 19.
Figure 21:
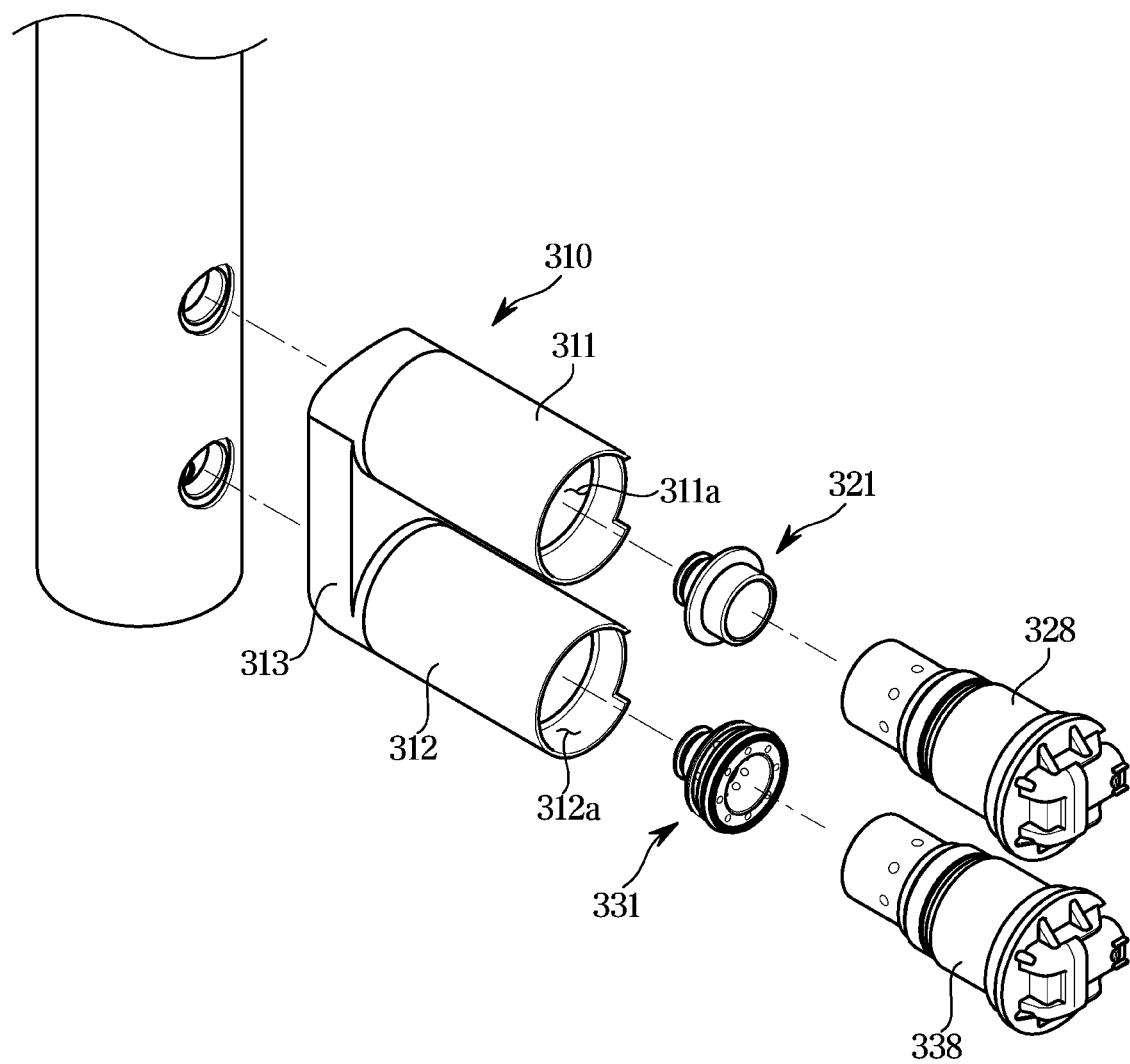
FIG. 21 is an exploded perspective view illustrating that a bridge port, a rebound solenoid valve and a compression solenoid valve are coupled to a base shell of the continuous damping control shock absorber according to the third embodiment of the disclosure.
Figure 22:
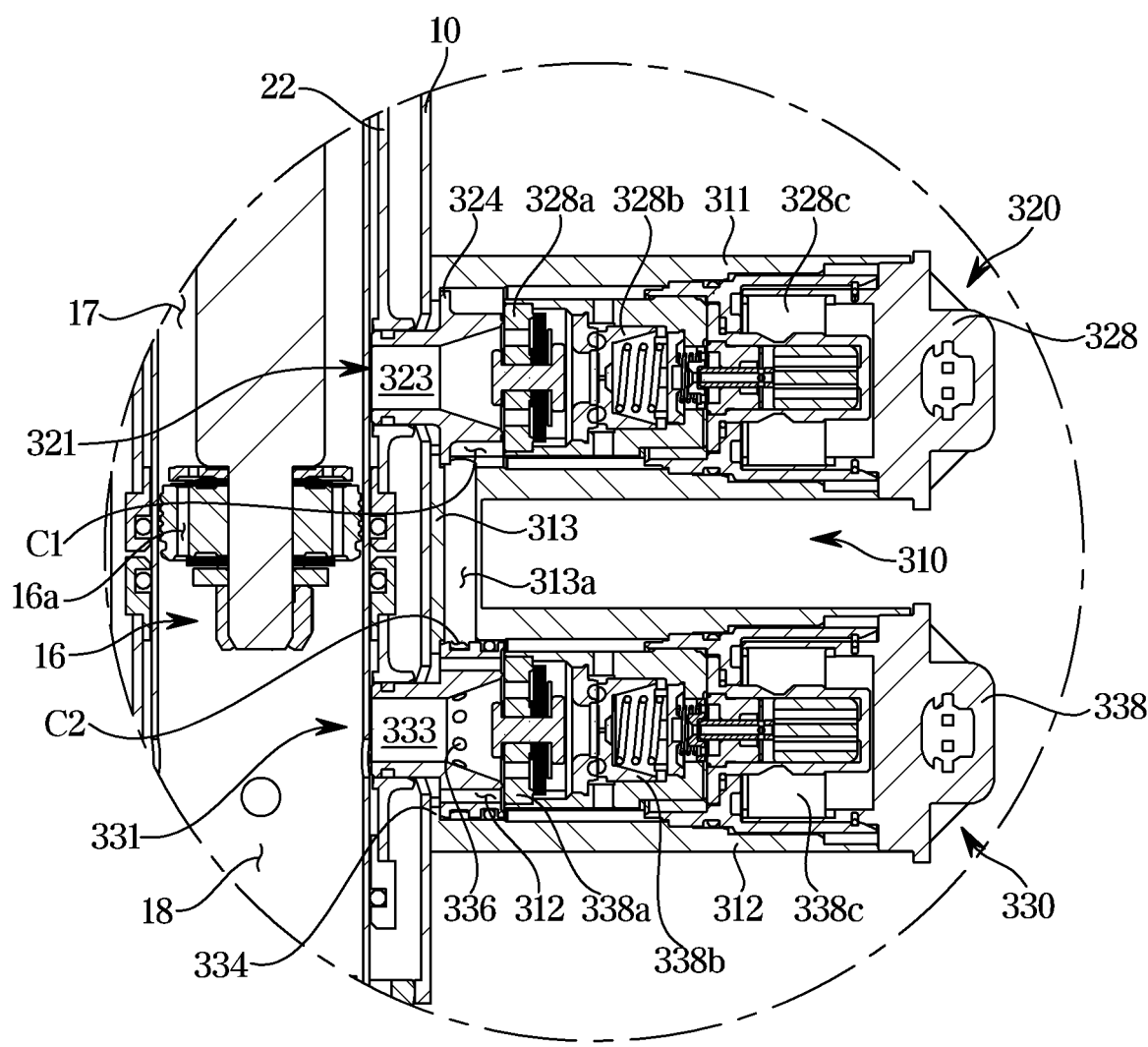
FIG. 22 is an assembly cross-sectional view of FIG. 21.
Figure 23:
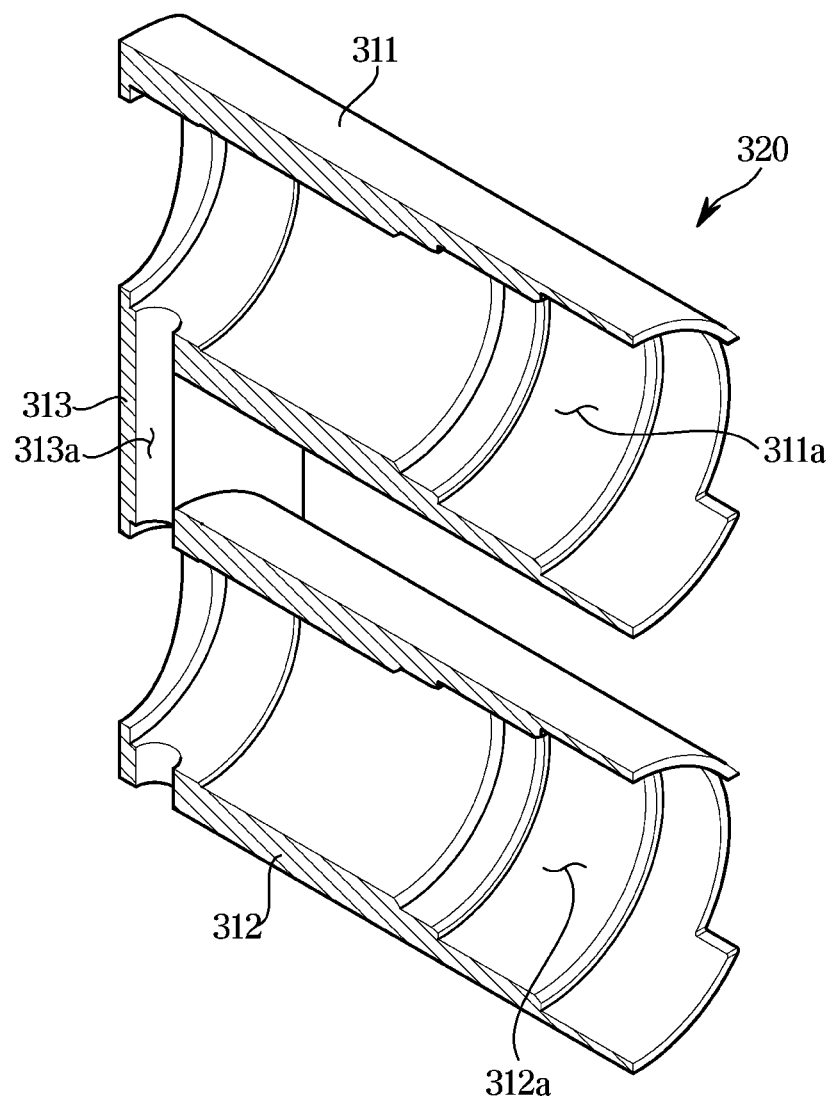
FIG. 23 is a cut-away perspective view of a solenoid valve housing provided in the continuous damping control shock absorber according to the third embodiment of the disclosure.
Figure 24:
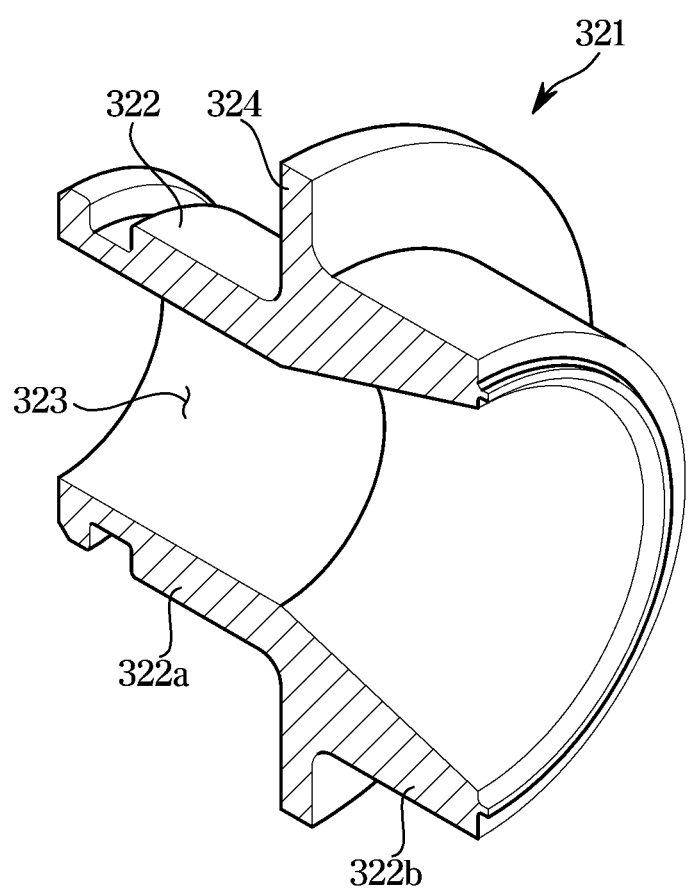
FIG. 24 is a cut-away perspective view of a rebound port provided in the continuous damping control shock absorber according to the third embodiment of the disclosure.
Figure 25:
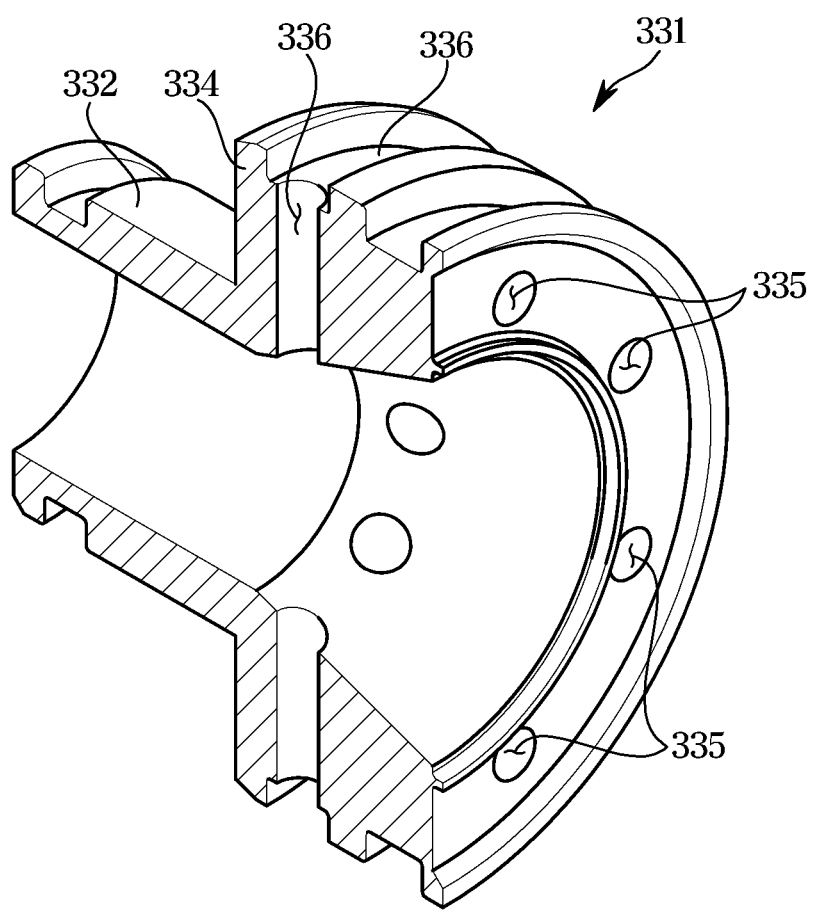
FIG. 25 is a cut-away perspective view of a compression port provided in the continuous damping control shock absorber according to the third embodiment of the disclosure.

FIG. 19 is a cross-sectional view of a continuous damping control shock absorber having a structure of a dual solenoid valve according to a third embodiment of the disclosure, FIG. 20 is an enlarged view of a main part of FIG. 19, FIG. 21 is an exploded perspective view illustrating that a bridge port, a rebound solenoid valve and a compression solenoid valve are coupled to a base shell of the continuous damping control shock absorber according to the third embodiment of the disclosure, FIG. 22 is an assembly cross-sectional view of FIG. 21, FIG. 23 is a cut-away perspective view of a solenoid valve housing provided in the continuous damping control shock absorber according to the third embodiment of the disclosure, FIG. 24 is a cut-away perspective view of a rebound port provided in the continuous damping control shock absorber according to the third embodiment of the disclosure, and FIG. 25 is a cut-away perspective view of a compression port provided in the continuous damping control shock absorber according to the third embodiment of the disclosure. Herein, the same reference numerals as those in the drawings of the first embodiment described above indicate members having the same function.

Referring to FIGS. 19 and 20, a continuous damping control shock absorber 300 according to a third embodiment of the disclosure may include a rebound solenoid valve 320, a compression solenoid valve 330, and a post port 310 in which the rebound solenoid valve 320 and the compression solenoid valve 330 are each installed.

Also, the continuous damping control shock absorber 300 includes the base shell 10, and the inner tube 13 installed inside the base shell 10 and in which the piston rod 12 is movably installed in a longitudinal direction.

The rod guide 14 and the body valve 15 are installed on the upper and lower ends of the inner tube 13 and the base shell 10, respectively.

The piston valve 16 having the oil passage 16a is coupled to one end of the piston rod 12, and the piston valve 16 divides the inner space of the inner tube 13 into the rebound chamber 17 and the compression chamber 18.

The upper cap 19 and the base cap 20 are installed on the upper and lower portions of the base shell 10, respectively.

Between the inner tube 13 and the base shell 10, the rebound separator tube 22 is installed on the upper side thereof, and the compression separator tube 23 is installed on the lower side thereof.

By the rebound separator tube 22 and the compression separator tube 23, the reservoir chamber 24 for compensating a volume change in the rebound chamber 17 and the compression chamber 18 according to the reciprocating motion of the piston rod 12 is formed inside the base shell 10.

In order to vary a damping force, the rebound solenoid valve 320 and the compression solenoid valve 330, which are damping force variable valves, are installed on the outer side of the base shell 10. The rebound solenoid valve 320 and the compression solenoid valve 330 may be coupled to the base shell 10 through the post port 310. A structure of being coupled through the post port 310 will be described again below.

The inner holes 13a and 13b are formed on the upper and lower sides of the inner tube 13, respectively. The inner hole 13a located on the upper side of the inner tube 13 communicates the rebound chamber 17 and the space formed between the rebound separator tube 22 and the inner tube 13. The inner hole 13b located on the lower side of the inner tube 13 communicates the compression chamber 18 and the space formed between the compression separator tube 23 and the inner tube 13. Accordingly, the rebound solenoid valve 320 coupled to the rebound separator tube 22 may be connected to the rebound chamber 17 through the upper inner hole 13a, and the compression solenoid valve 330 coupled to the compression separator tube 23 may be connected to the compression chamber 18 through the lower inner hole 13b. The inner holes 13a and 13b formed on the upper and lower sides of the inner tube 13 may be located at upper and lower sides of the movement range of the piston valve 16 moving together with the piston rod 12.

The continuous damping control shock absorber 300 described above is characterized by having a mechanical flow path that allows oil in the rebound chamber 17 to circulate through the rebound solenoid valve 320 and flow to the compression chamber 18 during a rebound stroke and allows oil in the compression chamber 18 to circulate through the compression solenoid valve 330 and flow to the reservoir chamber 24 during a compression stroke.

Referring to FIGS. 21 to 25, the continuous damping control shock absorber 300 according to the third embodiment of the disclosure may include the rebound solenoid valve 320, the compression solenoid valve 330, and the post port 310.

The post port 310 is mounted on the outer side of the base shell 10. The post port 310 may include a first coupling part 311 to which the rebound solenoid valve 320 is coupled, a second coupling part 312 to which the compression solenoid valve 330 is coupled, and a connection part 313 connecting the first coupling part 311 and the second coupling part 312 and having at least one communication hole 313a for directly communicating the rebound solenoid valve 320 and the compression solenoid valve 330.

The first coupling part 311 is formed in a cylindrical hollow shape to have a first receiving space 311a in which the rebound solenoid valve 320 is accommodated. Also, the first coupling part 311 is provided such that an inner circumferential surface thereof has a step and a rebound valve part 328 may be inserted therein. Accordingly, a rebound port 321 of the rebound solenoid valve 320, which will be described later, is coupled to the rebound separator tube 22 through the first receiving space 311a of the first coupling part 311, and the rebound valve part 328 is accommodated in the first receiving space 311a.

The second coupling part 312 is formed in a cylindrical hollow shape to have a second receiving space 312a in which the compression solenoid valve 330 is accommodated. Also, the second coupling part 312 is provided such that an inner circumferential surface thereof has a step and a compression valve part 338 may be inserted therein. Accordingly, a compression port 331 of the compression solenoid valve 330, which will be described later, is coupled to the compression separator tube 23 through the second receiving space 312a of the second coupling part 312, and the compression valve part 338 is accommodated in the second receiving space 312a.

The connection part 313 is disposed between the first and second coupling parts 311 and 312 and may be integrally formed with the first and second coupling parts 311 and 312 to have one body. The communication hole 313a formed in the connection part 313 is provided to communicate the first receiving space 311a and the second receiving space 312a. That is, as the first coupling part 311 and the second coupling part 312 are disposed to be spaced apart by a predetermined distance in the vertical direction to have axes parallel to each other, the communication hole 313a may be formed to be orthogonal to the central axes of the first and second coupling parts 311 and 312. As shown in the drawings, although two of the communication holes 313a are formed, the number of communication holes 313a is not limited thereto, and the number and shape of the communication holes 313a may be selectively changed as long as the amount of oil that is discharged from the rebound solenoid valve 320 may be sufficiently guided toward the compression solenoid valve 330.

A hole, which is formed on a lower side of the second coupling part 312 (no reference numeral) is formed by processing to form the communication hole 313a in the post port 310 from the outside, may be sealed through a separate plug member (no reference numeral) or the like after the communication hole 313 is processed.

By coupling the post port 310 to the base shell 10 in a state in which the rebound solenoid valve 320 and the compression solenoid valve 330 are coupled to the post port 310 or by coupling the post port 310 to the base shell 10 and then coupling the rebound solenoid valve 320 and the compression solenoid valve 330 to the post port 310, ease of mounting may be ensured.

The rebound solenoid valve 320 is coupled to the rebound separator tube 22 in a state of being coupled to the first coupling part 311 and configured such that oil in the rebound chamber 17 transferred from the rebound separator tube 22 during the rebound stroke circulates therethrough and is transmitted to the compression solenoid valve 330 through the communication hole 313a. The oil transferred to the compression solenoid valve 330 is guided to the compression chamber 18, and a structure therefor will be described again below.

The rebound solenoid valve 320 may include the rebound port 321 coupled to the rebound separator tube 22 and the rebound valve part 328 in communication with the rebound port 321 and adjusting the flow of oil by opening and closing a flow passage. In this case, the rebound solenoid valve 320 has a structure in which oil is introduced only through the rebound port 321 and reverse flow of oil in the introduced direction is prevented.

The rebound valve part 328 may include a soft valve 328a, a solenoid 328c generating an electromagnetic force, and an opening/closing part 328b operated by the solenoid 328c to open and close the flow passage. However, the shape and configuration of the rebound valve part 328 is not limited thereto, and the rebound valve part 328 may be variously modified as long as the flow of oil may be adjusted.

The rebound port 321 may include a first body part 322 coupled to the rebound separator tube 22 and having a central hollow portion forming a first rebound hole 323, and a first flange part 324 extending radially from the first body part 322. The first body part 322 and the first flange part 324 may be integrally formed to have one body.

One side of the first body part 322 may be coupled to the rebound separator tube 22, and the other side thereof may be in face-contact with the rebound valve part 328 to be closely coupled to the rebound valve part 328. Accordingly, oil transferred from the rebound chamber 17 through the first rebound hole 323 during the rebound stroke may be guided in a direction of directing to the rebound valve part 328 (right direction based on the rebound port shown in FIG. 4) and may circulate through the rebound solenoid valve 320 and be discharged.

More specifically, the first body part 322 is configured to have a small diameter portion 322a coupled to the rebound separator tube 22 on one side thereof and to have a large diameter portion 322b in close contact with the rebound valve part 328 on the other side thereof. In this case, an outer diameter of the large diameter portion 322b is provided smaller than an inner diameter of the first coupling part 311 so that the connection chamber C1 to communicate the rebound valve part 328 and the communication hole 313a is formed outside the large diameter portion 322b. The first flange part 324 may be provided between the small diameter portion 322a and the large diameter portion 322b to radially extend outward and to be seated on an inner side of the first coupling part 311.

The rebound port 321 may be coupled in the first coupling part 311 so that oil circulated and discharged from the rebound chamber 17 to the rebound solenoid valve 320 is guided to the communication hole 313a without leakage. The oil introduced into the rebound port 321 during the rebound stroke passes through the rebound valve part 328, the connection chamber C1, and the communication hole 313a in sequence, and is guided to the compression solenoid valve 330 side.

The rebound valve part 328 is configured such that one side thereof is in close contact with the rebound port 321 in the first receiving space 311a and the other side thereof closes an end of the first coupling part 311.

The compression solenoid valve 330 may include the compression port 331 coupled to the compression separator tube 23 and the compression valve part 338 in communication with the compression port 331 and adjusting the flow of oil by opening and closing a flow passage. In this case, the compression solenoid valve 330 has a structure in which oil is introduced only through the compression port 331 and reverse flow of oil in the introduced direction is prevented.

The compression valve part 338 may include a soft valve 338a, a solenoid 338c generating an electromagnetic force, and an opening/closing part 338b operated by the solenoid 338c to open and close the flow passage. However, the shape and configuration of the compression valve part 338 is not limited thereto, and the compression valve part 338 may be variously modified as long as the flow of oil may be adjusted.

The compression port 331 may include a first body part 322 coupled to the compression separator tube 23 and having a central hollow portion forming a second compression hole 335, and a second flange part 334 extending radially from the second body part 332. The second body part 332 and the second flange part 334 may be integrally formed to have one body.

One side of the second body part 332 may be coupled to the compression separator tube 23, and the other side thereof may be in face-contact with the compression valve part 338 to be closely coupled to the compression valve part 338. Accordingly, oil transferred from the compression chamber 18 through the first compression hole 333 during the compression stroke may be guided in a direction of directing to the compression valve part 338 (right direction based on the rebound port shown in FIG. 4) and may circulate through the compression solenoid valve 330 and be discharged.

In the second flange part 334, a second compression hole 335 to guide oil discharged from the compression solenoid valve 330 to the reservoir chamber 24 and a third compression hole 336 to guide oil discharged from the rebound solenoid valve 320 to the first compression hole 333 may be formed.

The second compression hole 335 may be formed to penetrate in a direction of directing to the other side of the second flange part 334 from one side of the second flange part 334 (left direction based on the compression port shown in FIG. 4) to be in communication with the reservoir chamber 24. A plurality of the second compression holes 335 may be formed at regular intervals along a circumferential direction of the second flange part 334. Accordingly, during the compression stroke, oil in the compression chamber 18 circulates in the compression solenoid valve 330 through the first compression hole 333 of the compression port 331 coupled to the compression separator tube 23, and oil discharged from the compression solenoid valve 330 is guided to the reservoir chamber 24 through the second compression hole 335.

The third compression hole 336 is formed to be in communication with the first compression hole 333 so that oil discharged through the communication hole 313a during the rebound stroke is guided to the first compression hole 333. A plurality of the third compression holes 336 may be formed along an outer circumferential surface of the second flange part 334 and may be formed to penetrate in the vertical direction, that is, toward the first compression hole 333 to be in communication with the first compression hole 333 formed to penetrate a central portion of the compression port 331. Accordingly, oil discharged from the rebound solenoid valve 320 during the rebound stroke is guided to the first compression hole 333 through the communication hole 313a and the third compression hole 336, and thus the oil is finally guided to the compression chamber 18.

As described above, because the rebound solenoid valve 320 and the compression solenoid valve 330 need to be configured to independently generate damping forces during the rebound stroke and the compression stroke, the second compression hole 335 and the third compression hole 336 may be disposed not to overlap each other and to be biased each other. That is, the compression port 331 serves to guide oil to flow into the compression chamber 18 through the third compression hole 336 and the first compression hole 331 during the rebound stroke, and to guide oil to flow into the reservoir chamber 24 through the first compression hole 333 and the second compression hole 335 during the compression stroke.

The second flange part 334 has a compression groove 337 formed to be concave along the outer circumferential surface thereof. The compression groove 337 may be formed at a position corresponding to the communication hole 313a to form the second connection chamber C2 between the compression groove 337 and the communication hole 313a. The third compression hole 336 may be formed on the compression groove 337. Accordingly, oil discharged from the communication hole 313a is guided to the plurality of third compression holes 336 through the second connection chamber C2 and is introduced into the first compression hole 333.

The compression port 331 may be coupled in the second coupling part 312 so that oil circulated and discharged from the compression chamber 18 to the compression solenoid valve 330 is guided to the reservoir chamber 24 without leakage. For example, the compression port 331 may be provided with a sealing groove formed to be concave along the outer peripheral surface of the second flange part 334 and include a sealing member (no reference numeral) inserted into the sealing groove, and the sealing member may prevent oil from leaking by being in contact with the inner circumferential surface of the second coupling part 312. Specifically, the sealing groove is provided on the second flange part 334 between the compression groove 337 and the compression valve part 338 to seal a gap between the second connection chamber C2 and a space of the compression valve part 338 side. Therefore, during the compression stroke, oil discharged from the compression solenoid valve 330 is guided to the reservoir chamber 24 through the second compression hole 335 formed in the second flange part 334, and during the rebound stroke, oil discharged from the rebound solenoid valve 320 may be guided to the first compression hole 333 through the communication hole 313a and through the third compression hole 336.

In the continuous damping control shock absorber 300 according to the third embodiment of the disclosure, because only one side of the post port 310 is welded to the base shell 10, a welding part may be minimized, and thus, assembly fault due to welding deformation may be reduced.

Also, in the continuous damping control shock absorber 300 according to the third embodiment of the disclosure, because the rebound solenoid valve 320 and the compression solenoid valve 330 are inserted into the first coupling part 311 and the second coupling part 312 to be press-fitted, respectively, productivity may be improved due to simple assembly, the number of the sealing members may decrease to a minimum due to fewer parts required for sealing, and oil leakage and production defects may be reduced.

Hereinafter, an operation of the continuous damping control shock absorber 300 according to the third embodiment of the disclosure will be described.

Figure 26:
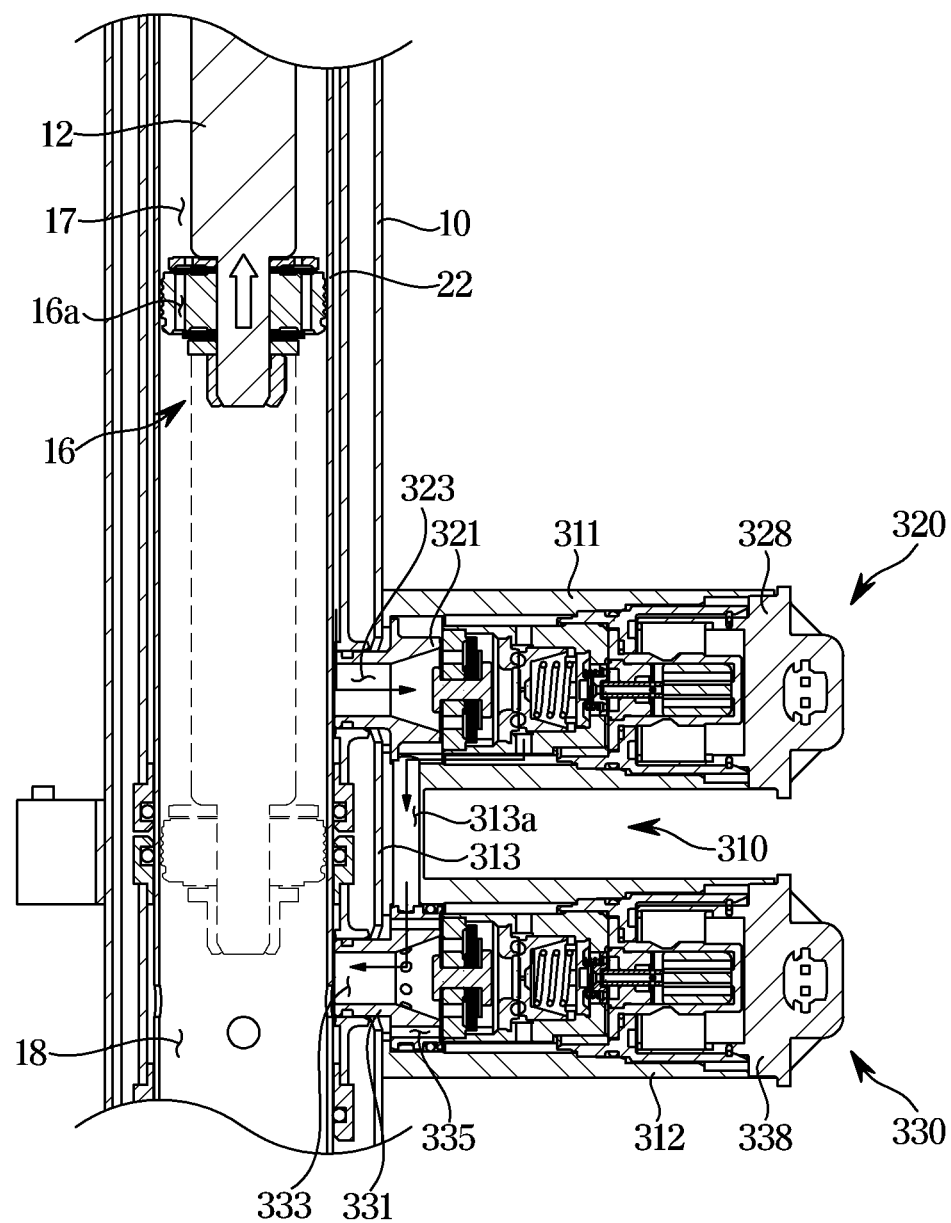
FIG. 26 is a view illustrating a flow of oil during a rebound stroke by the continuous damping control shock absorber according to the third embodiment of the disclosure.

FIG. 26 is a view illustrating a flow of oil during a rebound stroke by the continuous damping control shock absorber according to the third embodiment of the disclosure.

Referring to FIG. 26, when the piston rod 12 ascends during the rebound stroke, the rebound chamber 17 becomes a high pressure, and the compression chamber 18 becomes a low pressure. In this case, a part of oil in the rebound chamber 17 is guided to the first rebound hole 323 of the rebound port 321 coupled to the rebound separator tube 22 through the inner hole 13a formed on the upper side of the inner tube 13. Also, a part of the oil in the rebound chamber 17 is introduced into the compression chamber 18 through the oil passage 16a formed in the piston valve 16, thereby generating a damping force. The oil guided to the first rebound hole 323 circulates through the rebound solenoid valve 320, passes through the second rebound hole 125, the communication hole 313a, and the third compression hole 336 in sequence, and is introduced into the compression chamber 18 through the first compression hole 333, thereby controlling the damping force.

Figure 27:
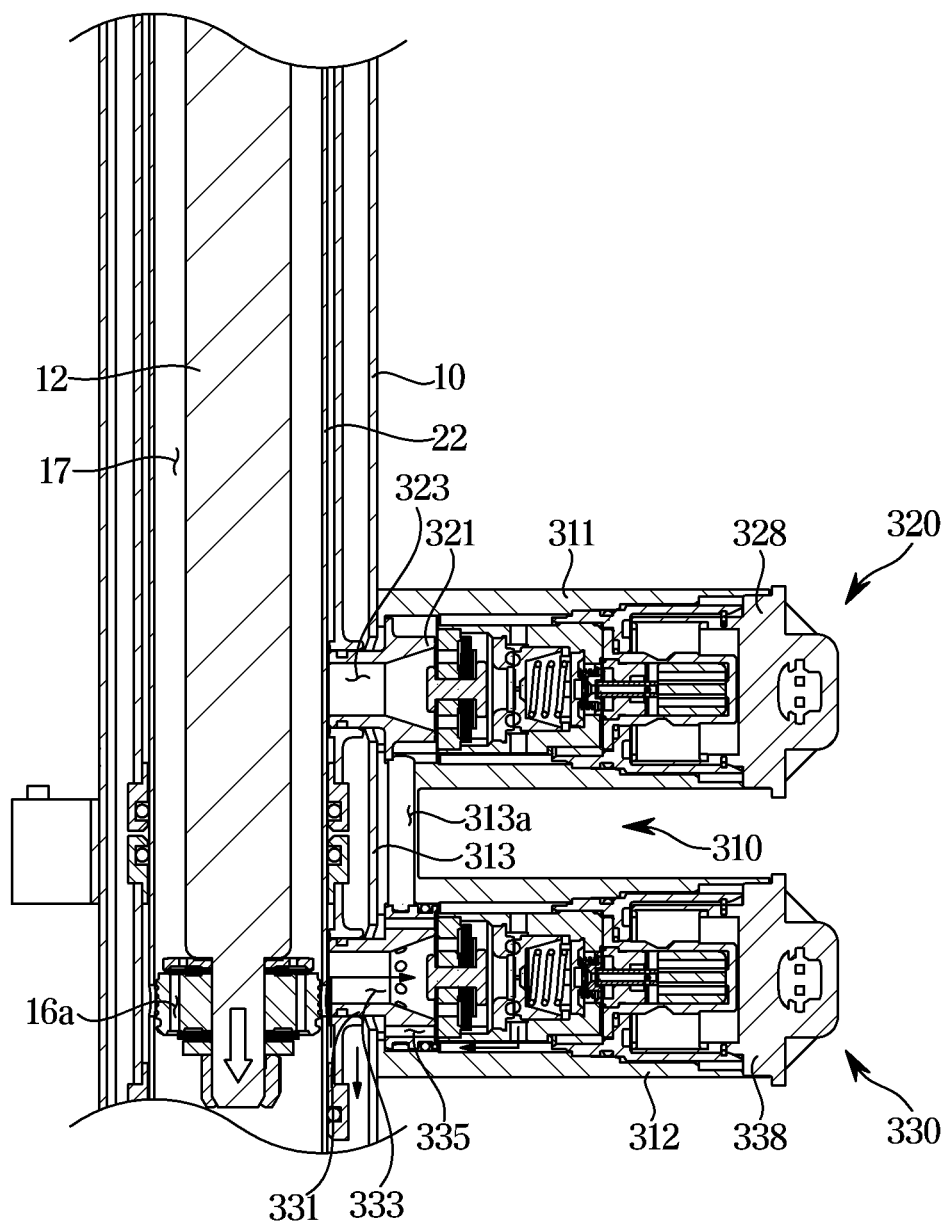
FIG. 27 is a view illustrating a flow of oil during a compression stroke by the continuous damping control shock absorber according to the third embodiment of the disclosure.

FIG. 27 is a view illustrating a flow of oil during a compression stroke by the continuous damping control shock absorber according to the third embodiment of the disclosure.

Referring to FIG. 27, when the piston rod 12 descends during the compression stroke, the compression chamber 18 becomes a high pressure, and the rebound chamber 17 becomes a low pressure. In this case, a part of oil in the compression chamber 18 is guided to the first compression hole 333 of the compression port 331 coupled to the compression separator tube 23 through the inner hole 13b formed on the lower side of the inner tube 13. Also, a part of the oil in the compression chamber 18 is introduced into the rebound chamber 17 through the oil passage 16a formed in the piston valve 16, thereby generating a damping force. The oil guided to the first compression hole 333 circulates through the compression solenoid valve 330 and is introduced into the reservoir chamber 24 through the second compression hole 335, thereby controlling the damping force.

As is apparent from the above, a continuous damping control shock absorber according to the disclosure can improve productivity by securing ease of mounting of a dual solenoid valve through a simple structure.

Further, the continuous damping control shock absorber according to the disclosure can prevent a decrease in compression damping force by securing a mechanical flow path to improve operation independence of a rebound solenoid valve and a compression solenoid valve.

Further, the continuous damping control shock absorber according to the disclosure can minimize a defect rate as well as prevent an increase in weight and material cost compared to the prior art.

While the disclosure has been particularly described with reference to exemplary embodiments, it should be understood by those of skilled in the art that various changes in form and details may be made without departing from the spirit and scope of the disclosure.

What is claimed is:

1. A continuous damping control shock absorber, which has a dual solenoid valve structure in which a rebound solenoid valve and a compression solenoid valve are provided, comprising
a post port mounted on an outer side of a base shell and in which the rebound solenoid valve and the compression solenoid valve are installed to be spaced apart from each other by a predetermined distance,
wherein the post port is provided with at least one communication hole to directly communicate oil discharged through and from the rebound solenoid valve into the compression solenoid valve during a rebound stroke.

2. The continuous damping control shock absorber according to claim 1, wherein
the post port comprises:
a first coupling part having a hollow portion to form a first receiving space to which the rebound solenoid valve is coupled;
a second coupling part having a hollow portion forming a second receiving space to which the compression solenoid valve is coupled; and
a connection part configured to connect the first coupling part and the second coupling part,
wherein the communication hole is formed in the connection part to communicate the rebound solenoid valve coupled to the first receiving space and the compression solenoid valve coupled to the second receiving space.

3. The continuous damping control shock absorber according to claim 2, wherein:
the first coupling part and the second coupling part are disposed to be spaced apart by a predetermined distance in a vertical direction to have central axes parallel to each other; and
the communication hole is formed to be orthogonal to the central axes of the first and second coupling parts.

4. The continuous damping control shock absorber according to claim 2, wherein
the rebound solenoid valve comprises a rebound port coupled to a rebound separator tube provided inside the base shell, and a rebound valve housing forming an outer shape of the rebound solenoid valve and coupled to the first coupling part.

5. The continuous damping control shock absorber according to claim 4, wherein:
the rebound port comprises a first body part coupled to the rebound separator tube and having a first rebound hole formed a central hollow portion, and a first flange part extending radially from the first body part; and
a second rebound hole to guide the oil circulating in and being discharged from the rebound solenoid valve through the first rebound hole during a rebound stroke to the communication hole is formed in the first flange part.

6. The continuous damping control shock absorber according to claim 5, wherein
the second rebound hole comprises a first rebound connection hole formed in a direction of directing to the other side of the first flange part from one side of the first flange part, and a second rebound connection hole formed on an outer circumferential surface of the first flange part to be in communication with the first rebound connection hole.

7. The continuous damping control shock absorber according to claim 2, wherein
the compression solenoid valve comprises a compression port coupled to a compression separator tube provided inside the base shell, and a compression valve housing forming an outer shape of the compression solenoid valve and coupled to the second coupling part.

8. The continuous damping control shock absorber according to claim 7, wherein:
the compression port comprises a second body part coupled to the compression separator tube and having a first compression hole formed a central hollow portion, and a second flange part extending radially from the second body part; and
a second compression hole to guide the oil circulating in and being discharged from the compression solenoid valve through the first compression hole during a compression stroke to a reservoir chamber is formed in the second flange part.

9. The continuous damping control shock absorber according to claim 8, wherein
a third compression hole in communication with the first compression hole to guide the oil discharged through the communication hole during a rebound stroke to the first compression hole is formed in the second flange part.

10. A continuous damping control shock absorber, which has a dual solenoid valve structure in which a rebound solenoid valve and a compression solenoid valve are provided, comprising
a bridge port mounted on an outer side of a base shell to be interposed between the rebound solenoid valve and the compression solenoid valve,
wherein the bridge port is provided with a communication hole to communicate oil discharged through and from the rebound solenoid valve into the compression solenoid valve during a rebound stroke.

11. The continuous damping control shock absorber according to claim 10, wherein:
the rebound solenoid valve and the compression solenoid valve are disposed to be spaced apart by a predetermined distance in a vertical direction to have axes parallel to each other; and
the communication hole is formed in the vertical direction so that the oil discharged from the rebound solenoid valve directly flows toward the compression solenoid valve.

12. The continuous damping control shock absorber according to claim 10, wherein:
the rebound solenoid valve comprises a rebound port coupled to a rebound separator tube provided inside the base shell and a rebound valve housing forming an outer shape of the rebound solenoid valve and coupled to the outer side of the base shell;
the compression solenoid valve comprises a compression port coupled to a compression separator tube provided inside the base shell and a compression valve housing forming an outer shape of the compression solenoid valve and coupled to the outer side of the base shell; and
the rebound valve housing is provided with a first connection hole at a position corresponding to one side of the communication hole and the compression valve housing is provided with a second connection hole at a position corresponding to the other side of the communication hole.

13. The continuous damping control shock absorber according to claim 12, wherein
the rebound port comprises a first body part coupled to the rebound separator tube and having a rebound hole formed a central hollow portion, and a first flange part extending radially from the first body part to be coupled to the rebound valve housing.

14. The continuous damping control shock absorber according to claim 12, wherein:
the compression port comprises a second body part coupled to the compression separator tube and having a first compression hole formed a central hollow portion, and a second flange part extending radially from the second body part to be coupled to the compression valve housing; and
a second compression hole to guide the oil circulating in and being discharged from the compression solenoid valve through the first compression hole during a compression stroke to a reservoir chamber is formed in the second flange part.

15. The continuous damping control shock absorber according to claim 10, wherein
the rebound solenoid valve comprises a rebound port inserted into a first receiving space to be coupled to a rebound separator tube provided inside the base shell, and a rebound valve part inserted into the first receiving space to be in communication with the rebound port and to adjust a flow of the oil.

16. The continuous damping control shock absorber according to claim 15, wherein
the rebound port comprises a first body part having a small diameter portion coupled to the rebound separator tube on one side thereof and a large diameter portion formed to expand from the other side thereof and provided with a first rebound hole formed a central hollow portion, and a first flange part extending radially from the first body part.

17. The continuous damping control shock absorber according to claim 10, wherein
the compression solenoid valve comprises a compression port inserted into a second receiving space to be coupled to a compression separator tube provided inside the base shell, and a compression valve part inserted into the second receiving space to be in communication with the compression port and to adjust a flow of the oil.

18. The continuous damping control shock absorber according to claim 17, wherein:
the compression port comprises a second body part coupled to the compression separator tube and provided with a first compression hole formed a central hollow portion, and a second flange part extending radially from the second body part; and
a second compression hole to guide the oil circulating in and being discharged from the compression valve part through the first compression hole during a compression stroke to a reservoir chamber is formed in the second flange part.

19. The continuous damping control shock absorber according to claim 18, wherein
a third compression hole in communication with the first compression hole to guide the oil discharged through the communication hole during a rebound stroke to the first compression hole is formed in the second flange part.

\* \* \* \* \*